United States Patent
Marushima et al.

(10) Patent No.: US 9,489,908 B2
(45) Date of Patent: Nov. 8, 2016

(54) DRIVE MODULE, DISPLAY PANEL, DISPLAY DEVICE, AND MULTI-DISPLAY DEVICE

(71) Applicant: SHARP KABUSHIKI KAISHA, Osaka-shi, Osaka (JP)

(72) Inventors: Yoshinari Marushima, Osaka (JP); Nakae Nakamura, Osaka (JP); Nobuaki Asayama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/442,842

(22) PCT Filed: Nov. 7, 2013

(86) PCT No.: PCT/JP2013/080068
§ 371 (c)(1),
(2) Date: May 14, 2015

(87) PCT Pub. No.: WO2014/077175
PCT Pub. Date: May 22, 2014

(65) Prior Publication Data
US 2015/0302815 A1    Oct. 22, 2015

(30) Foreign Application Priority Data
Nov. 16, 2012  (JP) ................................. 2012-252539

(51) Int. Cl.
*G06F 3/038*     (2013.01)
*G02F 1/1343*    (2006.01)
(Continued)

(52) U.S. Cl.
CPC ......... *G09G 3/3648* (2013.01); *G02F 1/13452* (2013.01); *G09G 3/3677* (2013.01); *G02F 2001/13456* (2013.01); *G09G 2300/043* (2013.01); *G09G 2300/0426* (2013.01); *G09G 2310/0281* (2013.01)

(58) Field of Classification Search
None
See application file for complete search history.

(56) References Cited

U.S. PATENT DOCUMENTS 4,645,303 A     2/1987  Sekiya et al.
6,300,997 B1 *  10/2001 Saito ..................... G02F 1/1345
                                                              349/149

(Continued)

FOREIGN PATENT DOCUMENTS

JP    60-222825    11/1985
JP    2002-189229   7/2002

(Continued)

OTHER PUBLICATIONS

International Search Report for PCT/JP2013/080068 mailed Jan. 14, 2014, four (4) pages.

(Continued)

*Primary Examiner* — Christopher R Lamb
(74) *Attorney, Agent, or Firm* — Nixon & Vanderhye P.C.

(57) ABSTRACT

In order to realize display control of a display panel in which gate signals and source signals are supplied to the display panel via only one side of the display panel, a display device (1) includes a driving module (12) including: input terminals via which input signals from an input signal generating section (13) are supplied; output terminals via which gate signals and source signals are outputted; a gate driving circuit for generating the gate signals; and a source driving circuit for generating the source signals, and a display panel (11) in which control terminals are provided on only one side of the display panel (11).

7 Claims, 26 Drawing Sheets

(51) Int. Cl.
*G09G 3/36* (2006.01)
*G02F 1/1345* (2006.01)

(56) References Cited

U.S. PATENT DOCUMENTS

| | | |
|---|---|---|
| 2002/0044251 A1 | 4/2002 | Togashi et al. |
| 2002/0109814 A1 | 8/2002 | Murahashi et al. |
| 2002/0167508 A1 | 11/2002 | Ishiyama |
| 2006/0180937 A1* | 8/2006 | Hayashi .............. G02F 1/13452 257/773 |
| 2006/0267160 A1 | 11/2006 | Kimura et al. |
| 2011/0050657 A1 | 3/2011 | Yamada |
| 2011/0235286 A1 | 9/2011 | Kitayama et al. |

FOREIGN PATENT DOCUMENTS

| | | |
|---|---|---|
| JP | 2002-244580 | 8/2002 |
| JP | 2002-311849 | 10/2002 |
| JP | 2007-11250 | 1/2007 |
| JP | 2009-162999 | 7/2009 |
| JP | 2011-47977 | 3/2011 |
| WO | WO 2011/070709 | 6/2011 |

OTHER PUBLICATIONS

International Preliminary Report on Patentability for PCT/JP2013/080068 dated Mar. 17, 2014, sixteen (16) pages.

* cited by examiner

F I G. 1
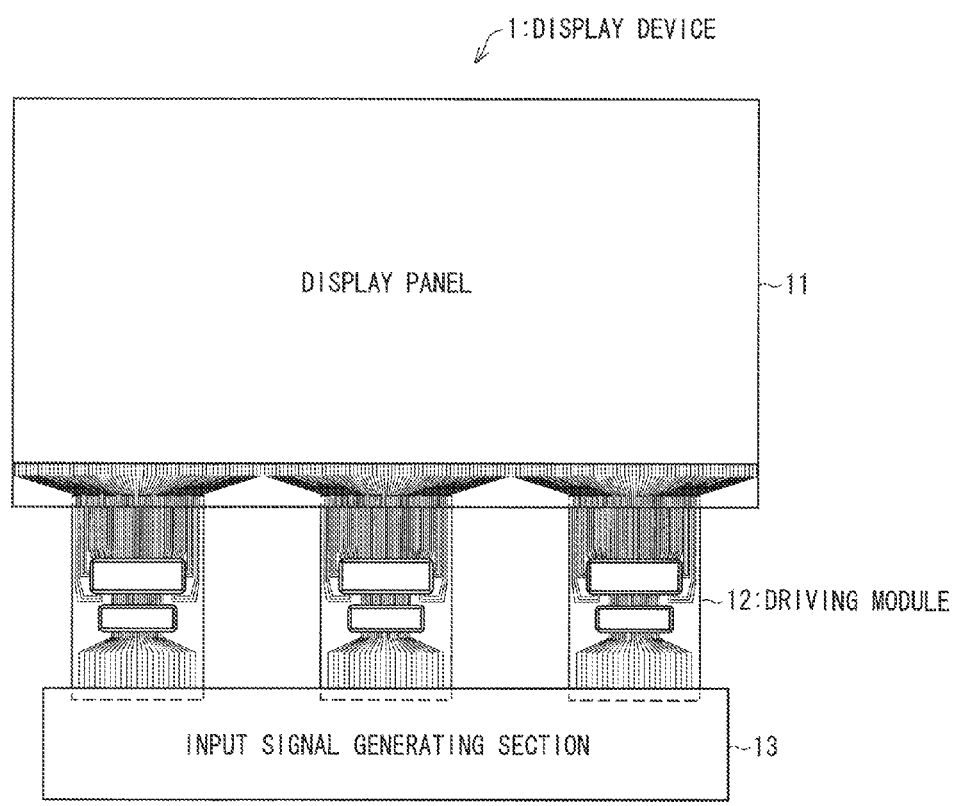

F I G. 6
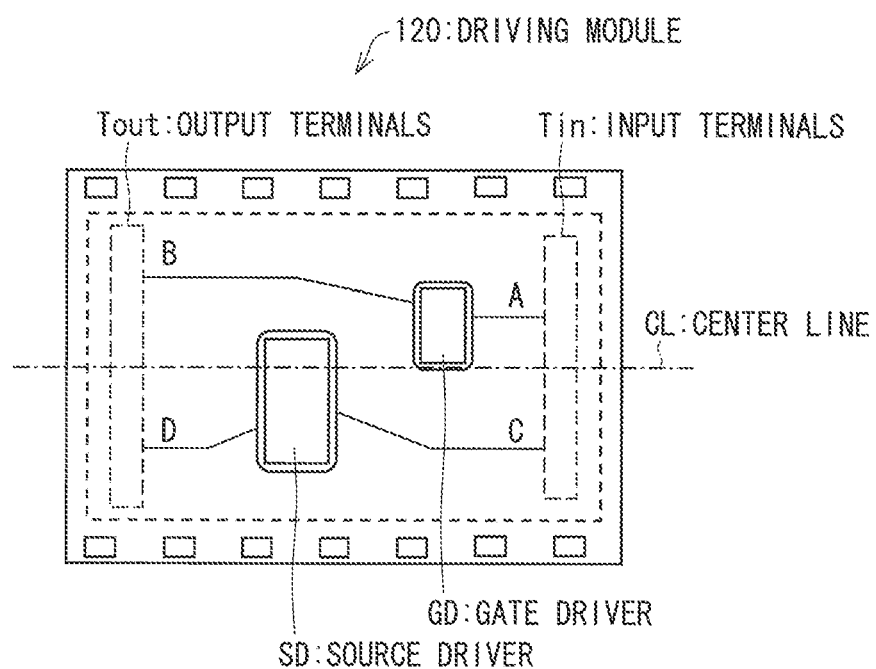

F I G. 9
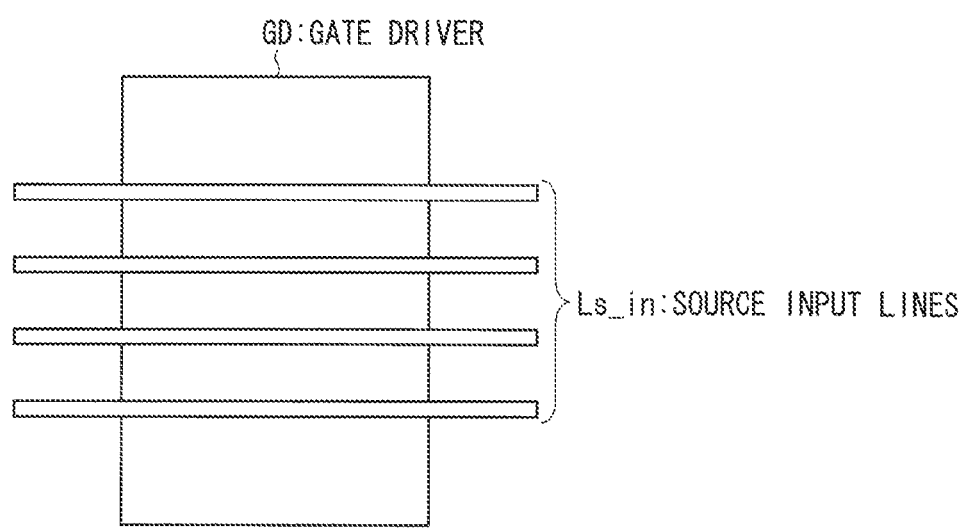

F I G. 15
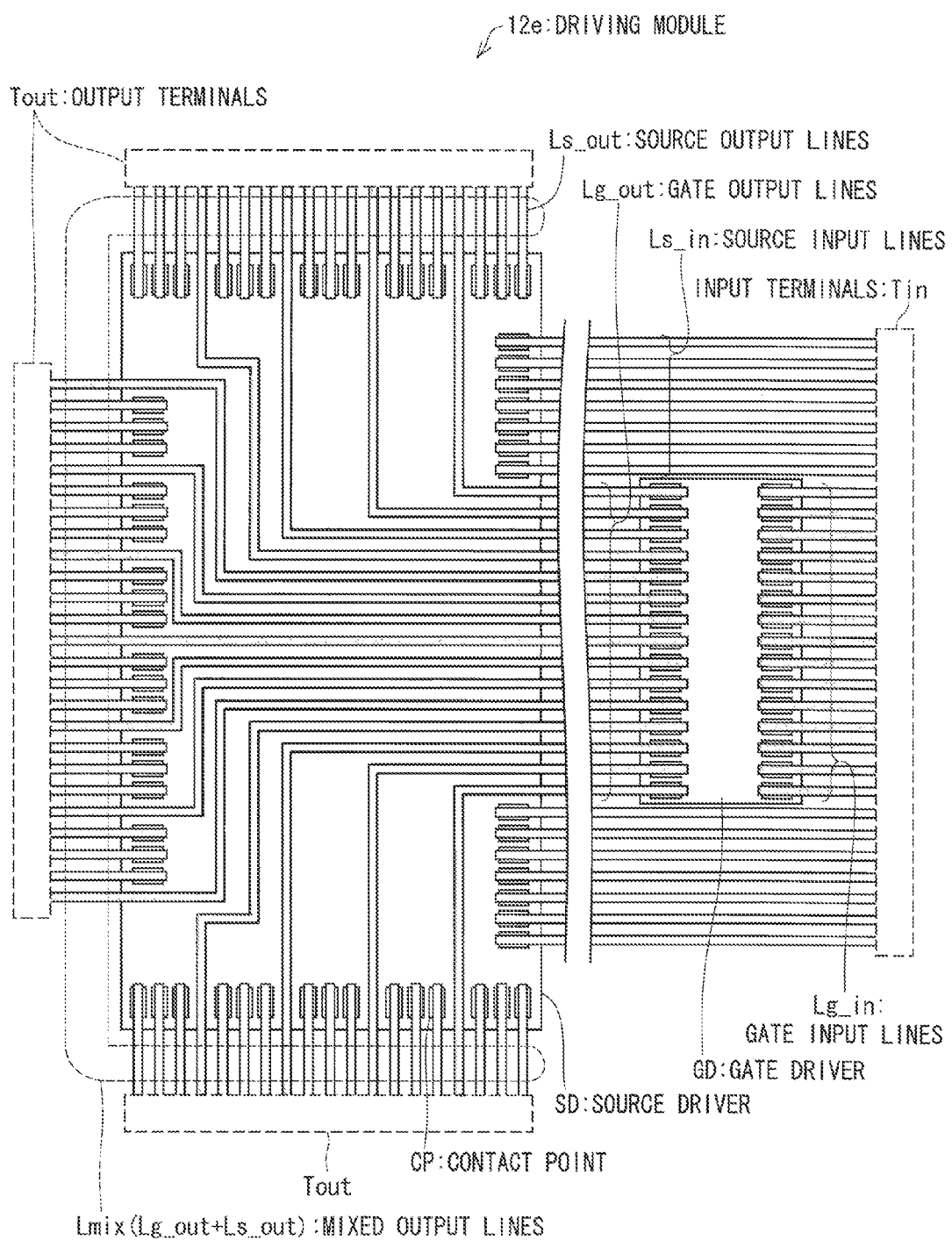

FIG. 21
(PRIOR ART)
(a)
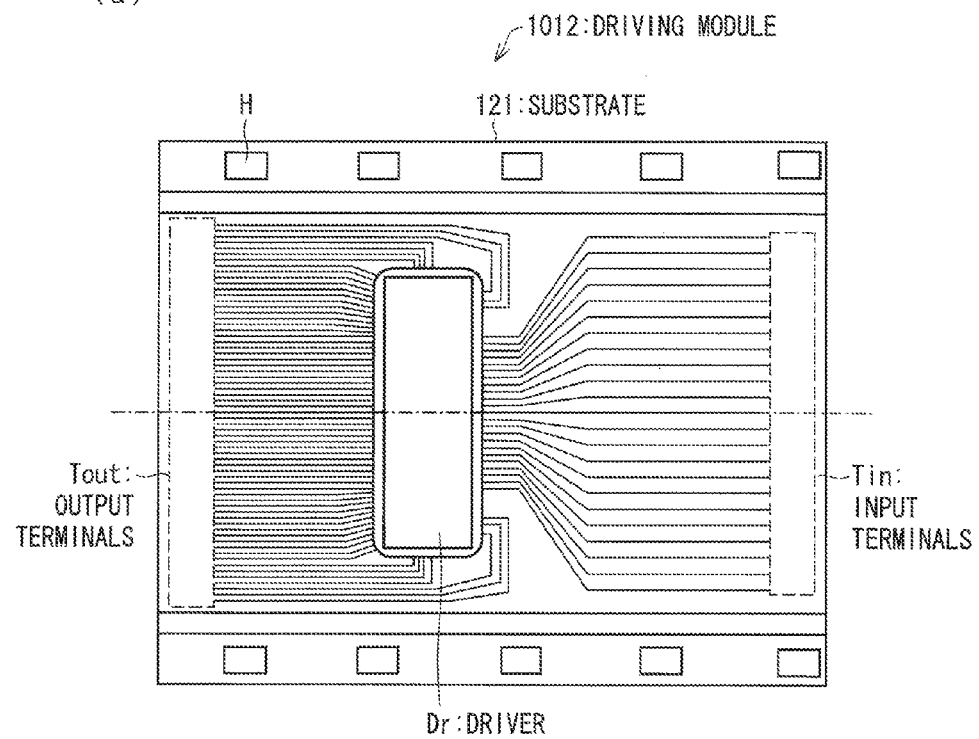
(b)
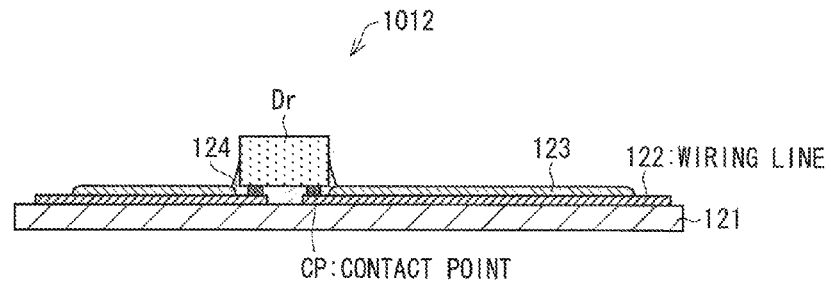

DRIVE MODULE, DISPLAY PANEL, DISPLAY DEVICE, AND MULTI-DISPLAY DEVICE

This application is the U.S. national phase of International Application No. PCT/JP2013/080068 filed 7 Nov. 2013 which designated the U.S. and claims priority to JP Patent Application No. 2012-252539 filed 16 Nov. 2012, the entire contents of each of which are hereby incorporated by reference.

TECHNICAL FIELD

The present invention relates to display devices to be combined with each other to serve as a multi-display device. In particular, the present invention relates to a technique for allowing display devices to be combined with each other in a smaller portion (non-display region).

BACKGROUND ART

Recently, flat panel displays using a liquid crystal panel etc. are getting larger. In particular, in a case of a multi-display device used in the field of digital signage, a plurality of large display devices each having a large display region are combined with each other to form a larger display region.

In the case of such a multi-display device, a larger display device can be easily constructed by positioning a plurality of display devices adjacently on a single surface and combining the plurality of display devices with each other, whereas a portion at which adjacent display devices are combined with each other has a frame called a bezel. This forms a region where no image can be displayed (hereinafter referred to as "non-display region"). Due to the non-display region, a display of a multi-display device seems to have latticed lines. This causes a problem of deterioration in quality of a displayed image.

Patent Literature 1 discloses a flat display including an image display section and a non-display section provided on a portion surrounding the image display section. In this flat display, a display portion and a non-display portion on the surrounding portion adjacent to the display section are provided with, on surfaces of the display portion and the non-display portion, an optical member for expanding a part of an image on the display section onto the non-display section, thereby narrowing a range of the non-display section.

That is, according to this technique, light from a periphery of the image display section is guided toward the non-display section by causing a cylindrical lens covering the periphery of the image display section to refract the light, so that the non-display section is made invisible.

FIG. 20 is a drawing illustrating a configuration of a display panel 1011 of a general liquid crystal display device. (a) of FIG. 20 illustrates a whole configuration of the display panel 1011. (b) of FIG. 20 illustrates a configuration of a pixel. As illustrated in (a) of FIG. 20, the display panel 1011 mainly includes a display section 1111, a source control terminal 1112, and a gate control terminal 1113. Furthermore, as illustrated in (b) of FIG. 20, a pixel E constituting the display section 1111 has a switching element S constituted by a TFT and a liquid crystal capacitor C1c. Display of the pixel E is controlled in such a manner that the switching element S is controlled to turn on/off by a gate signal supplied from a gate control line connected with a gate of the switching element S, so that a source signal supplied from a source control line connected with a source of the switching element S charges the liquid crystal capacitor C1c connected with a drain of the switching element S.

Normally, in a display device, a source control terminal 1112 is provided at a long side of the display panel 1011, and a gate control terminal 1113 is provided at a short side of the display panel 1011.

FIG. 21 is a drawing illustrating a configuration of a driving module 1012 in accordance with a conventional art. (a) of FIG. 21 is a top view of the driving module 1012 and (b) of FIG. 21 is a cross sectional view of the driving module 1012.

As illustrated in (a) of FIG. 21, the driving module 1012 includes input terminals Tin and output terminals Tout at ends thereof, and includes, at a center thereof, a driving circuit Dr which is a source driving circuit or a gate driving circuit.

As illustrated in (b) of FIG. 21, the driving module 1012 is constituted by stacking a substrate 121, wires 122, and solder resists 123. The driving circuit Dr is fixed to the driving module 1012 by a resin 124.

FIG. 22 is a drawing illustrating a configuration of wires connected with the driving circuit Dr of the driving module 1012 in accordance with the conventional art. As illustrated in FIG. 22, input lines Lin are drawn out from the input terminals Tin, and output lines Lout are drawn out mainly from the other three sides of the driving circuit Dr and extend to the output terminals Tout.

The driving module 1012 as above is connected with the source control terminal 1112 and the gate control terminal 1113 of the display panel 1011 illustrated in FIG. 20. Consequently, ends of the display panel 1011, at which ends the driving module 1012 is connected with the source control terminal 1112 and the gate control terminal 1113, are made large. Furthermore, such ends are non-display regions.

Therefore, in a case where a display device is used as a part of a multi-display device, ends of the display device which ends are non-display regions are required to be as small as possible.

FIG. 23 is a drawing illustrating a configuration described in Patent Literature 2. As illustrated in FIG. 23, a display panel (liquid crystal panel) 2001 disclosed in Patent Literature 2 includes a plurality of data line electrodes and a plurality of scanning line electrodes. The plurality of data line electrodes and the plurality of scanning line electrodes cross each other to form a matrix-shaped pixel section at intersections thereof. A mounting package 2021 is connected with an end portion at one side of a glass substrate 2001a of the display panel 2001. An LSI chip 2024 for driving the data line electrodes and an LSI chip 2023 for driving the scanning line electrodes are mounted on an insulating film substrate 2022 of the mounting package 2021 in such a manner that the LSI chip 2024 is closer to the display panel 2001 than the LSI chip 2023 is. A wire section 2028b is constituted by a plurality of wires which connect connection terminals 2027 with the LSI chip 2024. The wire section 2028b is fixed to the film substrate 2022 in such a manner as to pass below the LSI chip 2023 (a mounting region) provided on the film substrate 2022.

That is, in Patent Literature 2, in order to reduce a non-display region of a display device which is used in a multi-display device, a source driving circuit and a gate driving circuit are mounted on one side of the panel by mounting the gate driving circuit on a panel with use of a flexible package and bending the gate driving circuit toward a rear surface of the panel, or by extending output signals of the gate driving circuit.

CITATION LIST

Patent Literatures

[Patent Literature 1]
Japanese Patent Application Publication, Tokukai, No. 2009-162999 (published on Jul. 23, 2009)
[Patent Literature 2]
Japanese Patent Application Publication, Tokukai, No. 2002-244580 (published on Aug. 30, 2002)

SUMMARY OF INVENTION

Technical Problem

However, the above conventional art has problems below.

First, the configuration disclosed in Patent Literature 1 cannot eliminate a non-display region.

This is because, according to Patent Literature 1, source signals and gate signals are supplied to the display panel via different two sides of the display panel. This configuration requires the display device of Patent Literature 1 to be configured such that a gate driving circuit for generating a gate signal is mounted on the display device so as to be closer to a side of the display panel via which side a gate signal is supplied to the display panel, and a gate control terminal to be connected with the gate driving circuit is provided on that side so as to be connected with the gate driving circuit.

FIG. 24 is a drawing illustrating a configuration of a display device 3001 in accordance with the conventional art. As illustrated in FIG. 24, one side of the display panel 3011 is connected with a source driving module 3012. Another side of the display panel 3011 is connected with a gate driving module 3013. An end portion of the source driving module 3012, which portion is opposite to an end portion thereof connected with the display panel 3011, is connected with an input signal generating section 13.

FIG. 25 is a drawing illustrating a configuration of a display section 3111 of the display panel 3011 in accordance with the conventional art. As illustrated in FIG. 25, in the display section 3111, a gate control line Lg and a source control line Ls are orthogonal to each other. Due to this configuration, a source control terminal Ts is present on one side of the display section 3111, and a gate control terminal Tg is present on two other sides of the display section 3111.

FIG. 26 is a drawing illustrating the display panel 3011 in accordance with the conventional art. Since the display section 3111 has the configuration illustrated in FIG. 25, display panel control terminals 3112 are provided on three sides of the display section 3111 (display panel 3011) which sides correspond to the source control terminal Ts and the gate control terminals Tg (see FIG. 26).

That is, even if the source driving circuit and the gate driving circuit are made of a flexible material, the source driving circuit and the gate driving circuit still need connecting portions (display panel control terminals 3112). This makes it difficult to eliminate non-display portions on the three sides of the display section 3111.

In contrast, in the configuration disclosed in Patent Literature 2, the gate driving circuit and the source driving circuit are mounted on a single side of the display panel so as to make a non-display portion smaller. However, since this configuration requires wires from a side of the display panel via which side gate signals are supplied to the display panel to a side of the display panel on which side the source driving circuit is mounted, the non-display portion cannot be eliminated.

That is, the configuration disclosed in Patent Literature 2 has difficulty in eliminating at least two non-display regions of the display panel.

In view of the foregoing problems, an object of the present invention is to provide (i) a display device whose display can be controlled by supplying gate signals and source signals to a matrix liquid crystal display panel via only one side of the liquid crystal display panel, (ii) a driving module constituting the display device, and (iii) a display panel constituting the display device.

Solution to Problem

In order to solve the foregoing problems, a driving module in accordance with one aspect of the present invention is a driving module, including: an input terminal via which an input signal is supplied to the driving module; at least one gate output terminal via which a gate signal is outputted from the driving module; at least one source output terminal via which a source signal is outputted from the driving module; a gate driving circuit for generating the gate signal from the input signal supplied to the driving module via the input terminal; and a source driving circuit for generating the source signal from the input signal supplied to the driving module via the input terminal; at least one gate wire via which the gate driving circuit is connected with said at least one gate output terminal; and at least one source wire via which the source driving circuit is connected with said at least one source output terminal, said at least one gate output terminal and said at least one source output terminal each being provided on only one side of the driving module, the source driving circuit having a quadrangular shape, the source driving circuit being connected via said at least one source wire with said at least one source output terminal at three sides of the source driving circuit, the gate driving circuit being connected with said at least one gate output terminal via said at least one gate wire passing through the source driving circuit and the three sides of the source driving circuit, and said at least one gate wire and said at least one source wire being mixed and fanning out from the source driving circuit.

A display panel in accordance with one aspect of the present invention is a display panel, including: gate control lines parallel to each other; source control lines parallel to each other and orthogonal to the gate control lines; gate control branch lines branching from the respective gate control lines; source control terminals connected with the respective source control lines; and gate control terminals connected with the respective gate control branch lines, the display panel having a quadrangular shape, and the gate control terminals and the source control terminals each being provided on only one side of the display panel.

Advantageous Effects of Invention

With one aspect of the present invention, it is possible to provide a driving module suitable for controlling display of a matrix liquid crystal display panel in which a gate signal and a source signal are supplied via only one side of the liquid crystal display panel.

Furthermore, with one aspect of the present invention, it is possible to provide a display panel including control terminals on only one side thereof.

By including the driving module and the display panel, it is possible to provide a display device whose display can be controlled by supplying a gate signal and a source signal to a matrix liquid crystal display panel via only one side of the liquid crystal display panel.

BRIEF DESCRIPTION OF DRAWINGS

FIG. 1 is a drawing illustrating a configuration of a display device in accordance with one aspect of the present invention.

FIG. 6 is a drawing illustrating a configuration of a comparative example to be compared with the driving module in FIG. 5.

FIG. 9 is a drawing illustrating wires passing through a gate driver included in the driving module in FIG. 8.

FIG. 15 is a drawing illustrating a configuration of a driving module in accordance with another aspect of the present invention.

FIG. 21 is a drawing illustrating a configuration of a driving module in a conventional art. (a) of FIG. 21 is a top view and (b) of FIG. 21 is a cross sectional view.

DESCRIPTION OF EMBODIMENTS

Figure 2:
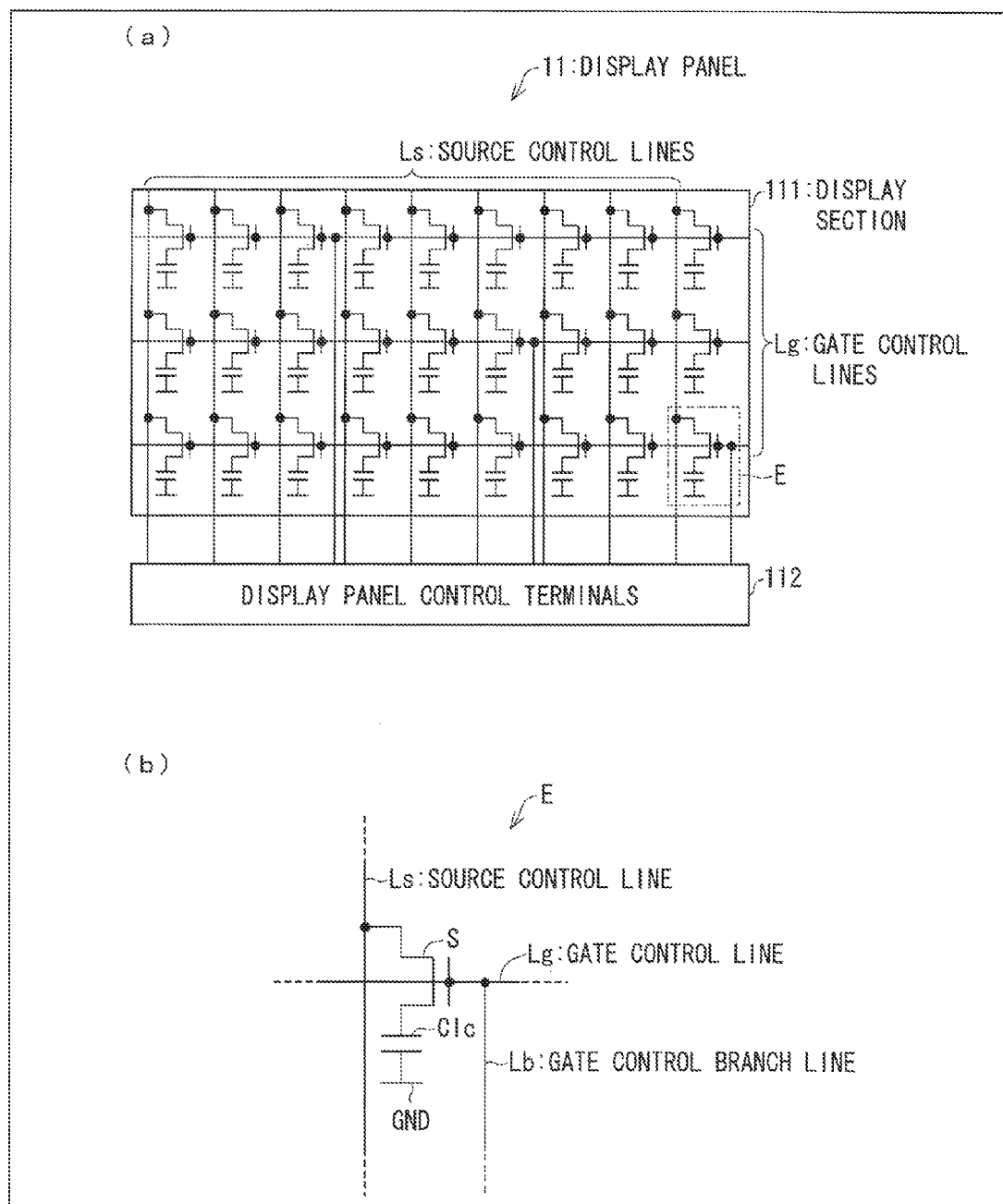
FIG. 2 is a drawing illustrating a configuration of a display panel included in the display device in FIG. 1. (a) of FIG. 2 illustrates a whole configuration and (b) of FIG. 2 illustrates a configuration of a pixel.

The following description will discuss embodiments of the present invention in details.

First Embodiment

The following description will discuss one embodiment of the present invention with reference to FIGS. 1 through 10 etc.

<Configuration of Display Device 1>

FIG. 1 is a drawing illustrating a configuration of a display device 1 in accordance with one aspect of the present invention. As illustrated in FIG. 1, the display device 1 includes an input signal generating section 13, a display panel 11, and driving modules 12.

As mentioned later, the driving modules 12 each include (i) input terminals via which input signals from the input signal generating section 13 are supplied to the driving module 12, (ii) gate output terminals via which gate signals are outputted, and (iii) source output terminals via which source signals are outputted. Furthermore, the driving modules 12 each include a gate driving circuit and a source driving circuit. The gate driving circuit and the source driving circuit generate the gate signals and the source signals, respectively, from the input signals supplied to the driving module 12 via the input terminals. The gate output terminals and the source output terminals are provided on only one side of the driving module 12. The display panel 11 includes (i) gate control terminals which are connected with the gate output terminals and which receive the gate signals and (ii) source control terminals which are connected with the source output terminals and which receive the source signals. The display panel 11 has a quadrangular shape. The gate control terminals and the source control terminals are provided on only one side of the display panel 11.

The following description will discuss main components of the display device 1 in details.

(Input Signal Generating Section 13)

The input signal generating section 13 supplies input signals to the driving module 12. The input signals may include, for example, an electric signal used for supplying electric power for driving the driving module 12, a data signal for display, and a control signal such as a clock signal used when drivers of the driving module 12 generate source signals and gate signals.

(Display Panel 11)

FIG. 2 is a drawing illustrating a configuration of the display panel 11 of the display device 1. (a) of FIG. 2 illustrates a whole configuration of the display panel 11 and (b) of FIG. 2 illustrates a configuration of a pixel E. As illustrated in (a) of FIG. 2, the display panel 11 includes a display section 111 and display panel control terminals (including gate control terminals and source control terminals) 112. As illustrated in FIG. 2, the display panel 11 has a quadrangular shape and includes, on only one side thereof, the display panel control terminals 112 to be connected with output terminals of the driving module 12.

In this configuration, the display section 111 includes a plurality of source control lines Ls and a plurality of gate control lines Lg. The plurality of source control lines Ls are provided linearly and parallel to each other. The plurality of gate control lines Lg are provided linearly and parallel to each other, and orthogonal to the source control lines Ls.

A source signal herein refers to a signal flowing in the source control line Ls. A gate signal herein refers to a signal flowing in the gate control line Lg.

The display section 111 may be constituted by a set of pixels E one of which is framed by a broken line in (a) of FIG. 2.

As illustrated in (b) of FIG. 2, the pixels E each include a switching element S and a liquid crystal capacitor Clc. The switching element S may be a thin film transistor (TFT) etc. A drain of the switching element S is connected with one end of the liquid crystal capacitor Clc. Another end of the liquid crystal capacitor Clc is connected with a ground GND and is grounded.

Furthermore, a gate of the switching element S is connected with the gate control line Lg. Consequently, the switching element S is controlled with use of a gate signal supplied from the gate control line Lg, so that a source signal supplied from the source control line Ls connected with a source of the switching element S charges the liquid crystal capacitor Clc connected with the drain of the switching element S. Thus, display of the display section 111 is controlled.

Furthermore, a gate control branch line Lb branches from the gate control line Lg. Specifically, as illustrated in (a) of FIG. 2, the gate control branch line Lb branches from the gate control line Lg with respect to every three source control lines Ls. This allows the gate control branch line Lb to be drawn out in the same direction as the direction in which the source control line Ls is drawn out, thereby connecting the gate control branch line Lb with the display panel control terminal 112. Consequently, display of the display panel 11 can be controlled by a gate signal and a source signal with use of the display panel control terminal 112 which is provided on only one side of the display panel 11.

Figure 3:
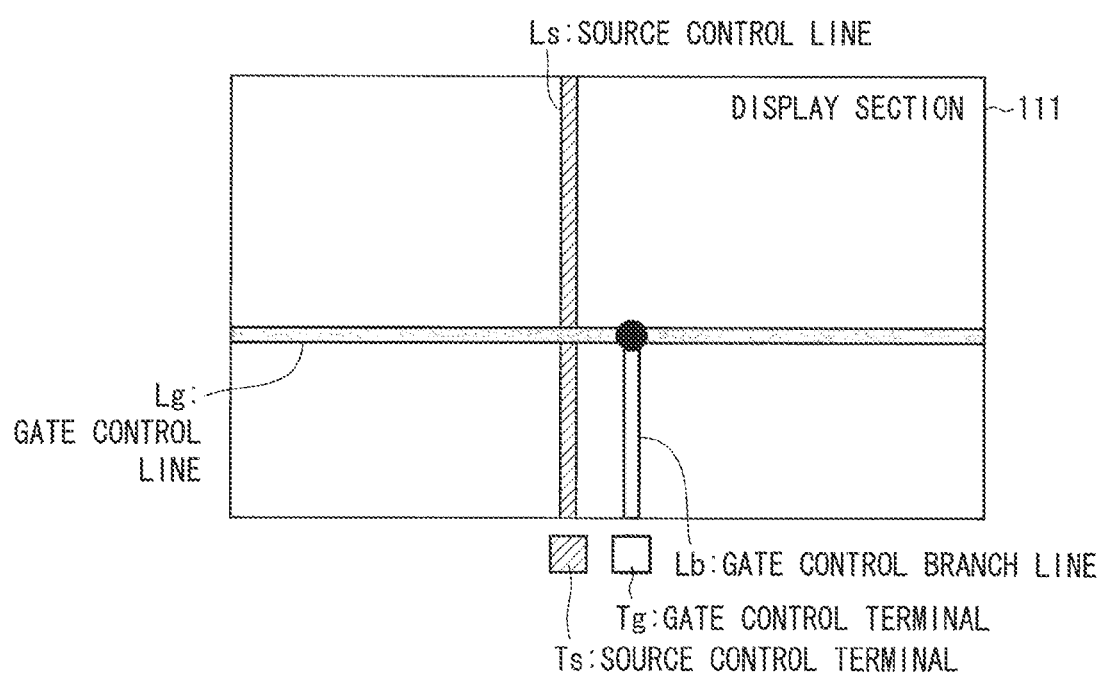
FIG. 3 is a drawing schematically illustrating a configuration of control lines of a display section included in the display panel in FIG. 2.

FIG. 3 is a drawing schematically illustrating a configuration of control lines (source control line Ls, gate control line Lg, and gate control branch line Lb) of the display section 111. As illustrated in FIG. 3, in the display section 111, the source control line Ls extends to an end of the display section 111 and is connected with the source control terminal Ts. The gate control branch line Lb branches from the gate control line Lg. The gate control branch line Lb extends to an end of the display section 111 and is connected with the gate control terminal Tg.

As described above, terminals (source control terminal Ts, gate control terminal Tg) which correspond to respective control lines of the display section 111 are provided on one side of the display section 111. Such terminals constitute the display panel control terminals 112.

Figure 4:
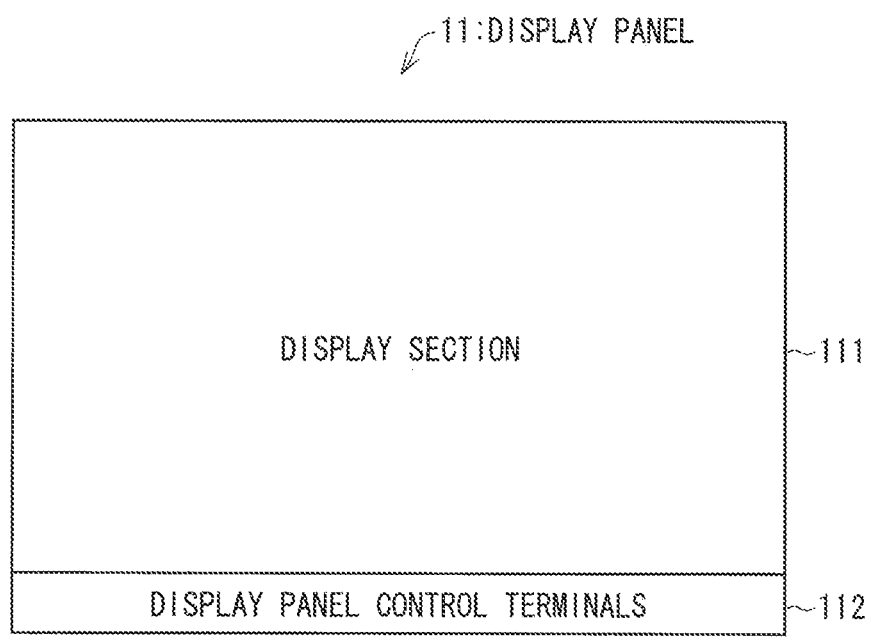
FIG. 4 is a drawing illustrating a positional relationship between the display section included in the display panel in FIG. 2 and display panel control terminals.

FIG. 4 is a drawing illustrating a positional relationship between the display section 111 and the display panel control terminals 112. As illustrated in FIG. 4, the display panel control terminals 112 are provided on only one side of the display section 111.

That is, the display panel 11 is a display panel including: a plurality of gate control lines Lg which are parallel to each other; and a plurality of source control lines Ls which are parallel to each other and are orthogonal to the gate control lines Lg. The display panel 11 includes the gate control branch lines Lb which branch from the respective plurality of gate control lines Lg, the source control terminals Ts connected with the respective plurality of source control lines Ls, and the gate control terminals Tg connected with the respective gate control branch lines Lb. The display panel 11 has a quadrangular shape. The gate control terminals Tg and the source control terminals Ts are provided on only one side of the display panel 11.

With the configuration, it is possible to provide a display panel including, only on one side thereof, control terminals (display panel control terminals 112 (including the gate control terminals Tg and the source control terminals Ts)).

The display panel control terminals 112 are connected with output terminals of the driving module 12 which is a driver for driving the display panel 11. The following description will discuss the driving module 12 in details.

(Driving Module 12)

Figure 5:
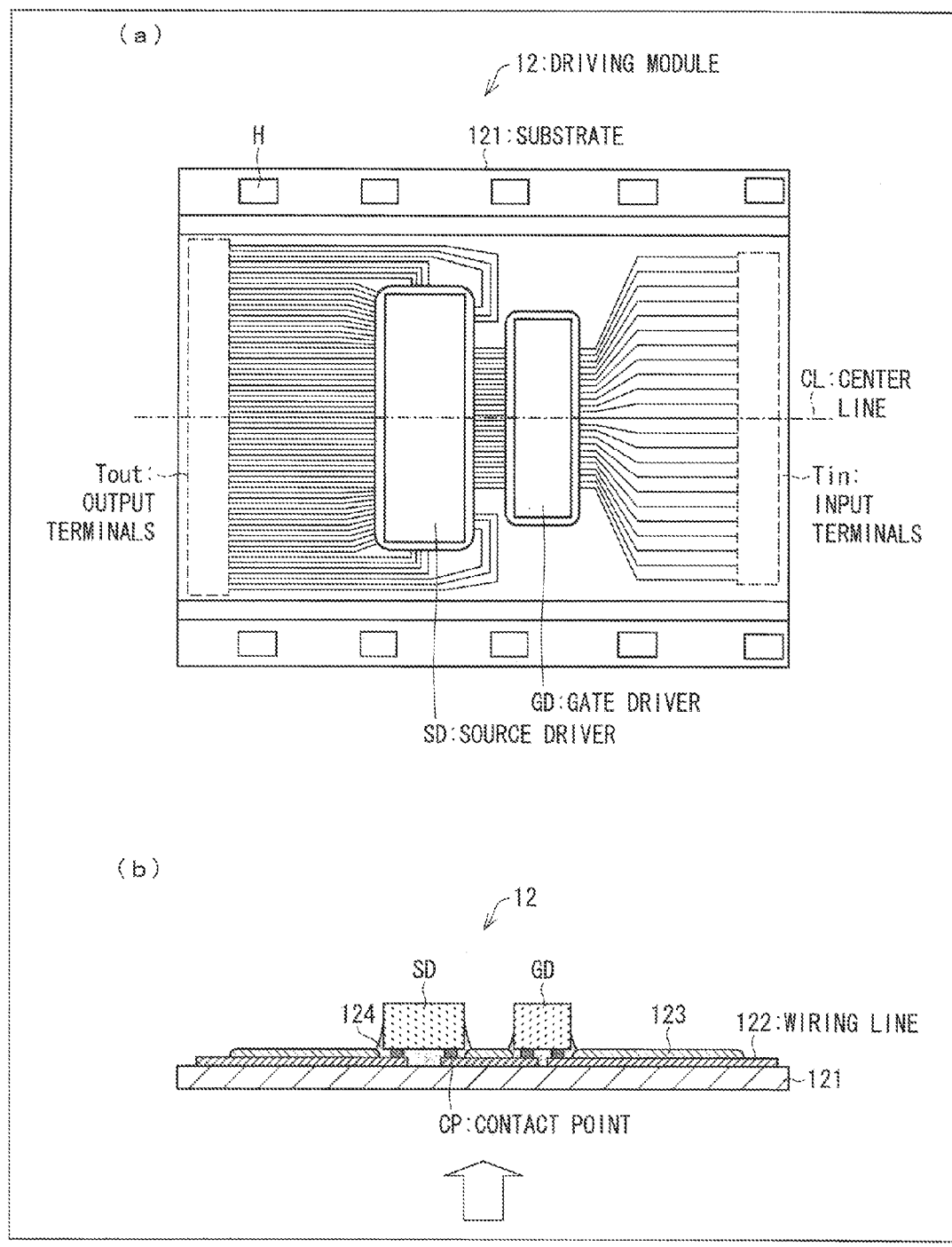
FIG. 5 is a drawing illustrating a configuration of a driving module included in the display device in FIG. 1. (a) of FIG. 5 is a top view and (b) of FIG. 5 is a cross sectional view.

FIG. 5 is a drawing illustrating a configuration of the driving module 12 of the display device 1. (a) of FIG. 5 is a top view of the driving module 12 and (b) of FIG. 5 is a cross sectional view of the driving module 12. As illustrated in (a) of FIG. 5, the driving module 12 includes input terminals Tin, a gate driver (gate driving circuit) GD, a source driver (source driving circuit) SD, and output terminals Tout, each of which is provided on a single substrate 121. The output terminals Tout are provided on only one side of the driving module 12, and include gate output terminals via which output signals (gate signals) of the gate driver GD are outputted and source output terminals via which output signals (source signals) of the source driver SD are outputted. That is, the gate output terminals and the source output terminals are provided on only one side of the driving module 12.

In this configuration, the gate driver GD and the source driver SD are provided on the single substrate 121. However, the present invention is not limited to this configuration. For example, the gate driver GD and the source driver SD may be provided on a respective plurality of stacked substrates, or may be provided on respective different surfaces, i.e. respective both surfaces of a single substrate.

Alternatively, the gate driver GD and the source driver SD may be included in a single chip. This allows a further reduction in the number of driver chips as compared with a configuration in which a gate signal and a source signal are generated by separate drivers, so that a driving module can be made smaller and lower in cost.

The input terminals Tin and the output terminals Tout are provided at ends of the driving module 12 (substrate 121).

The substrate 121 may be an insulating flexible tape or film. In a case where the substrate 121 is a flexible tape, the gate driver GD or the source driver SD may be formed on the substrate 121 by a technique such as a Chip On Film (COF). Furthermore, the substrate 121 may be moved or processed with use of a sprocket hole H provided in the substrate 121.

Figure 18:
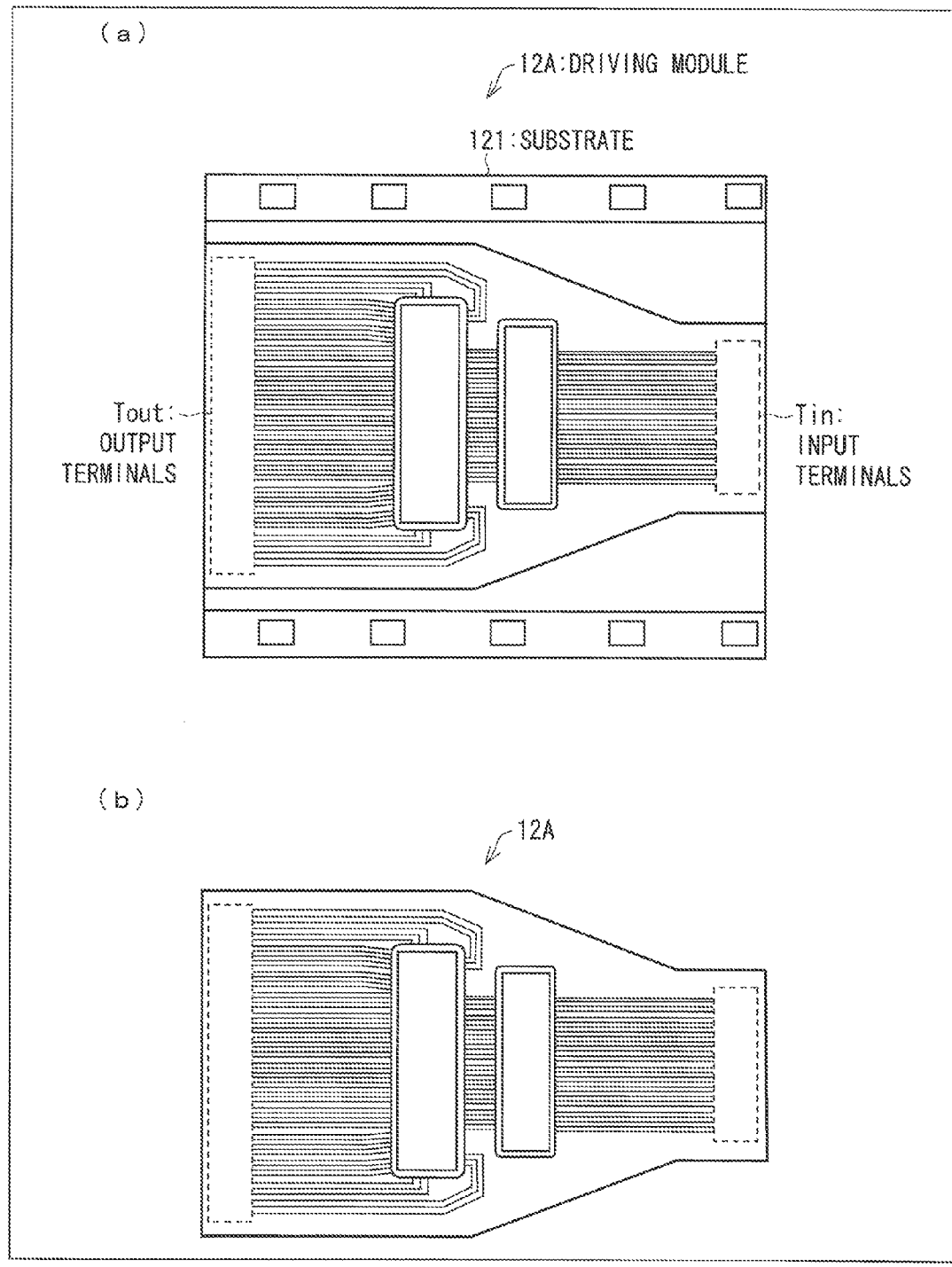
FIG. 18 is a drawing illustrating a configuration of a driving module in accordance with another aspect of the present invention. (a) of FIG. 18 illustrates a state before a substrate is punched. (b) of FIG. 18 illustrates a state after the substrate is punched.
Figure 19:
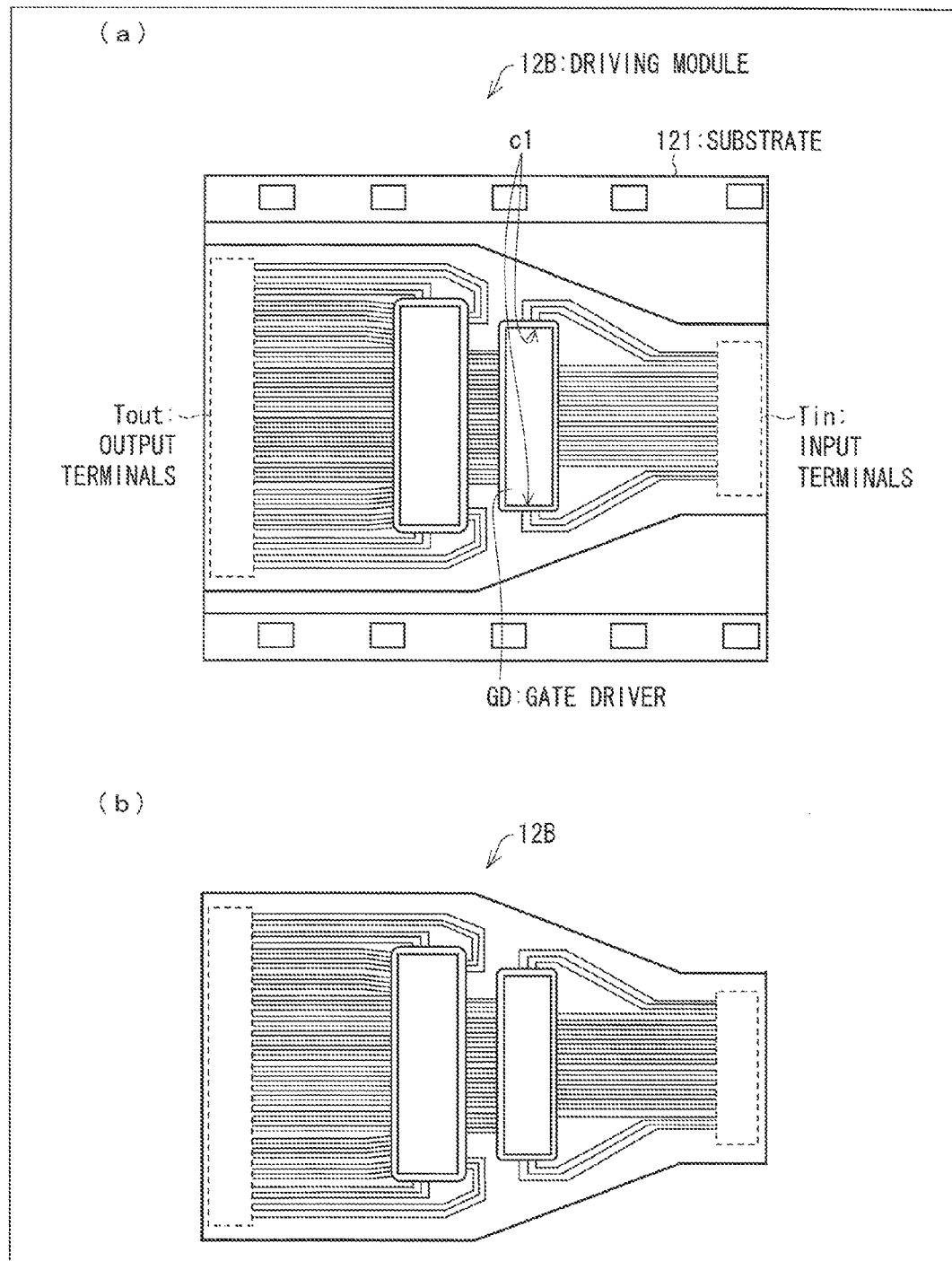
FIG. 19 is a drawing illustrating a configuration of a driving module in accordance with another aspect of the present invention. (a) of FIG. 19 illustrates a state before a substrate is punched. (b) of FIG. 19 illustrates a state after the substrate is punched.
Figure 20:
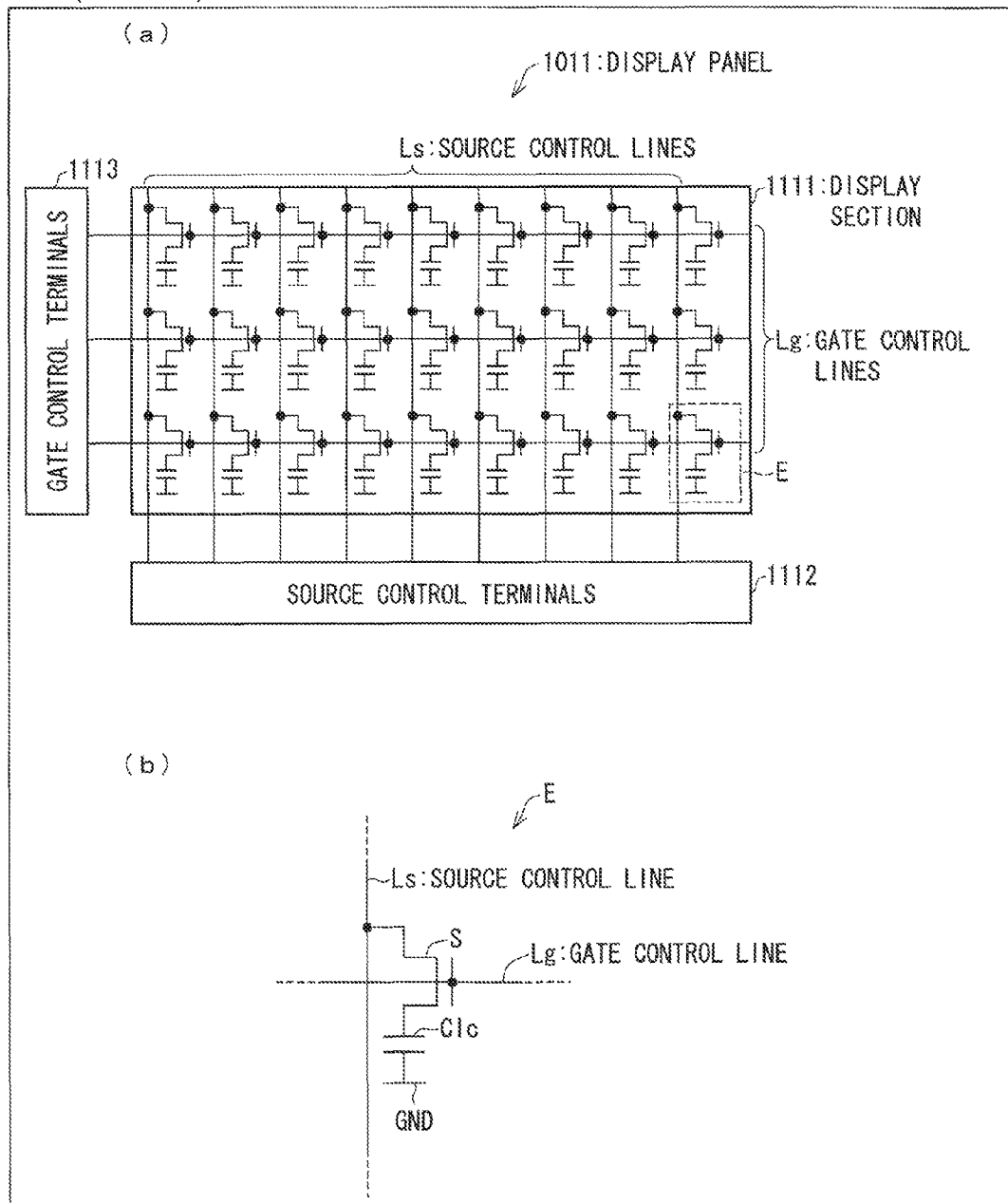
FIG. 20 is a drawing illustrating a configuration of a display panel in a general liquid crystal display device in the conventional art. (a) of FIG. 20 illustrates a whole configuration. (b) of FIG. 20 illustrates a configuration of a pixel.
Figure 22:
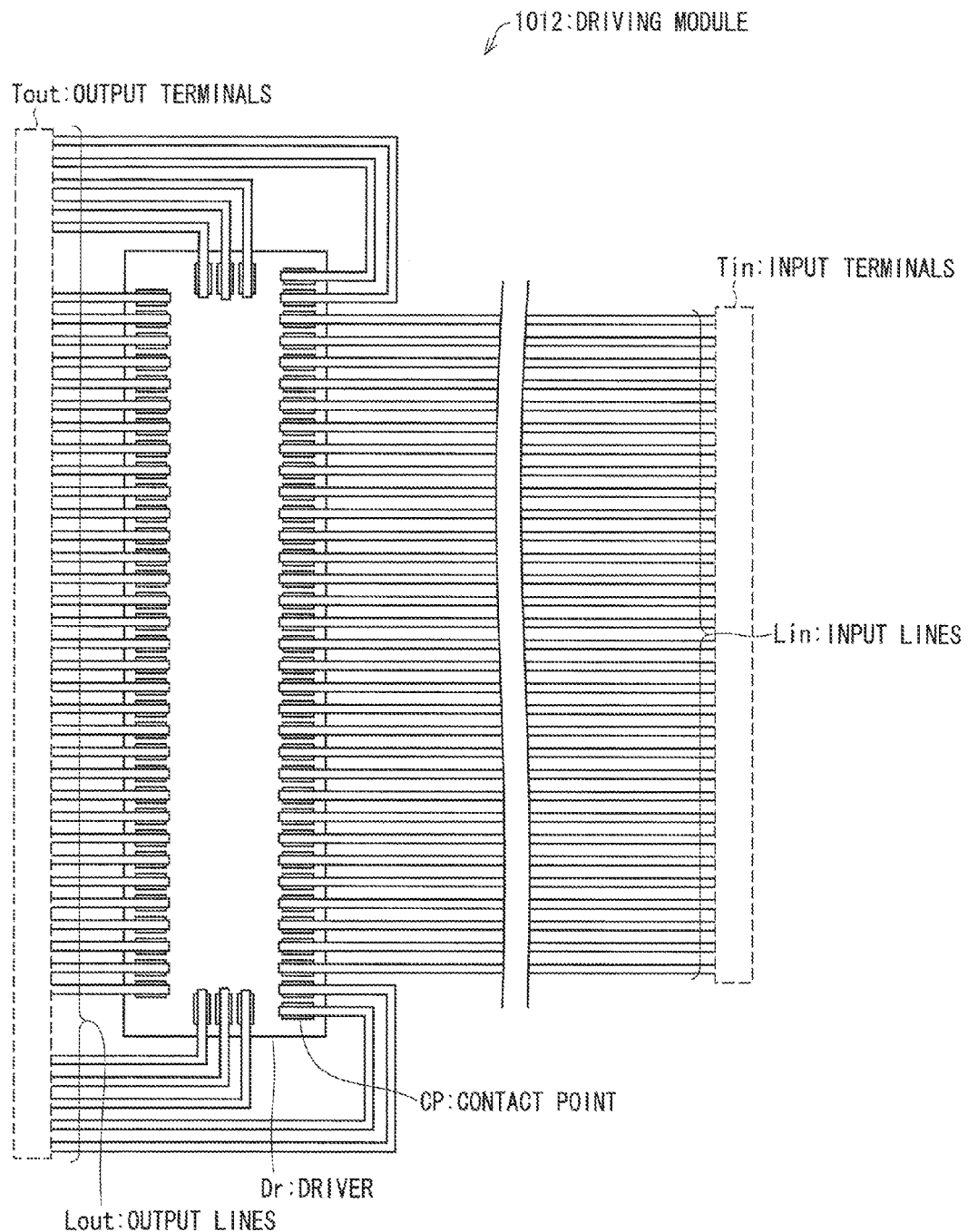
FIG. 22 is a drawing illustrating a configuration of wires connected with a driving circuit of a driving module in a conventional art.
Figure 23:
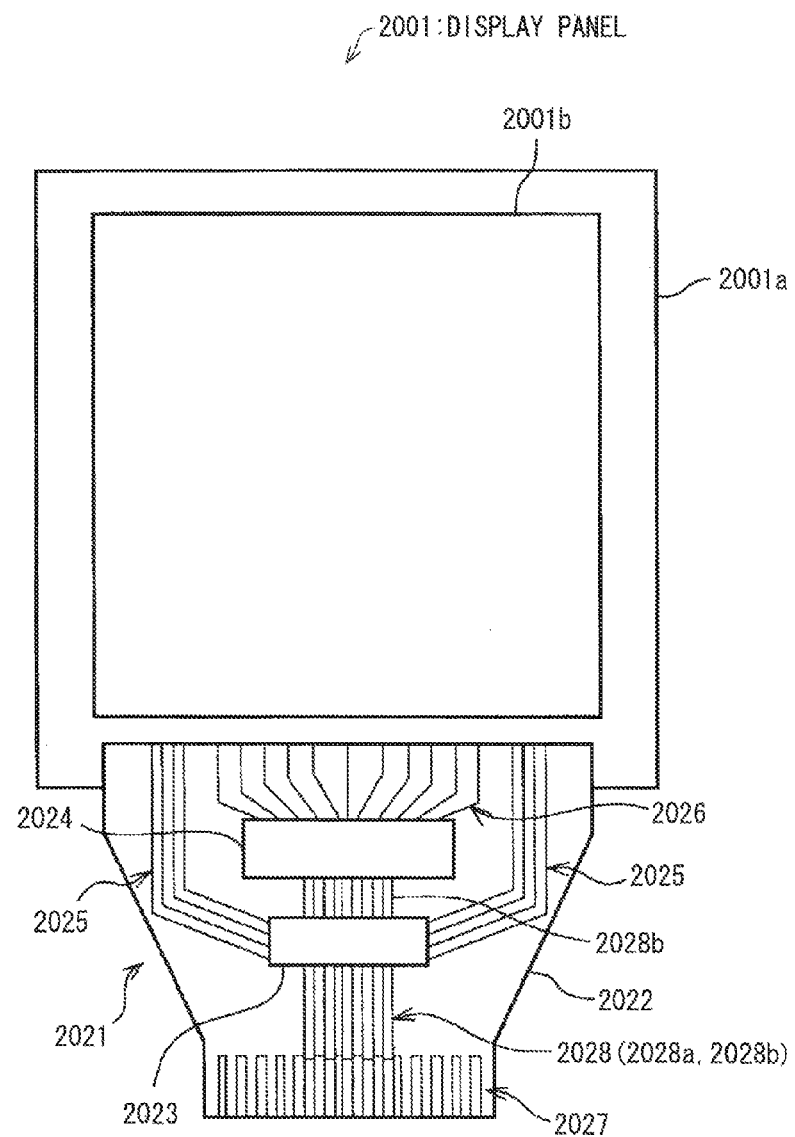
FIG. 23 is a drawing illustrating a configuration described in Patent Literature 2 in a prior art.
Figure 24:
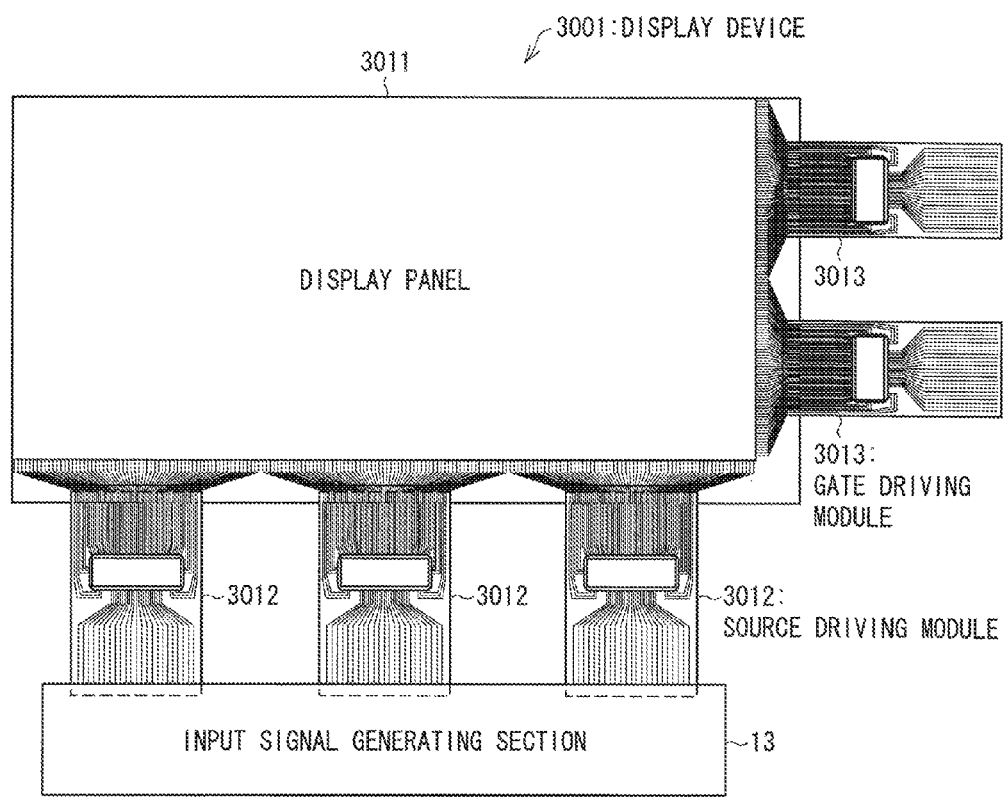
FIG. 24 is a drawing illustrating a configuration of a display device in a conventional art.
Figure 25:
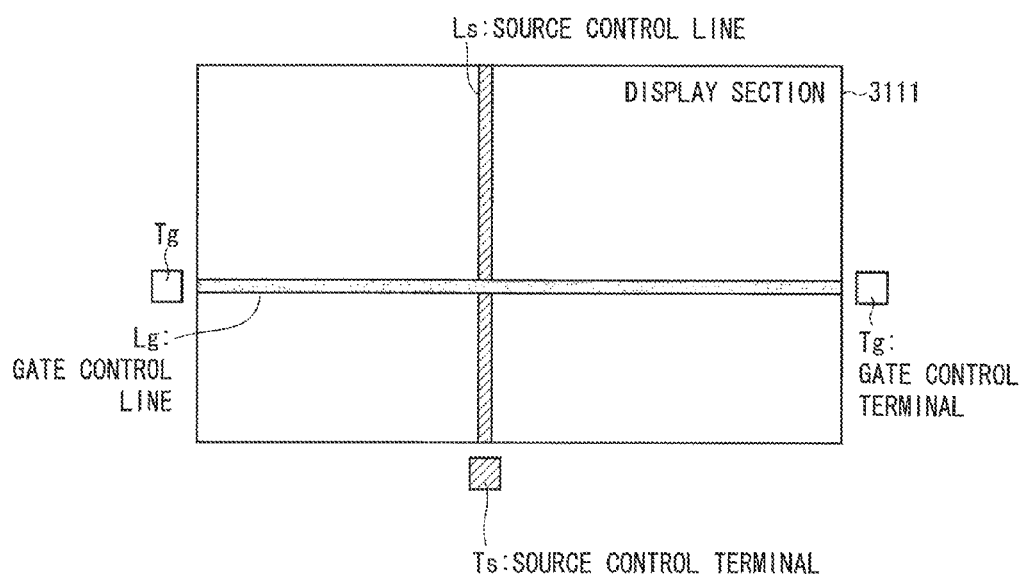
FIG. 25 is a drawing illustrating a configuration of a display section included in a display panel in a conventional art.
Figure 26:
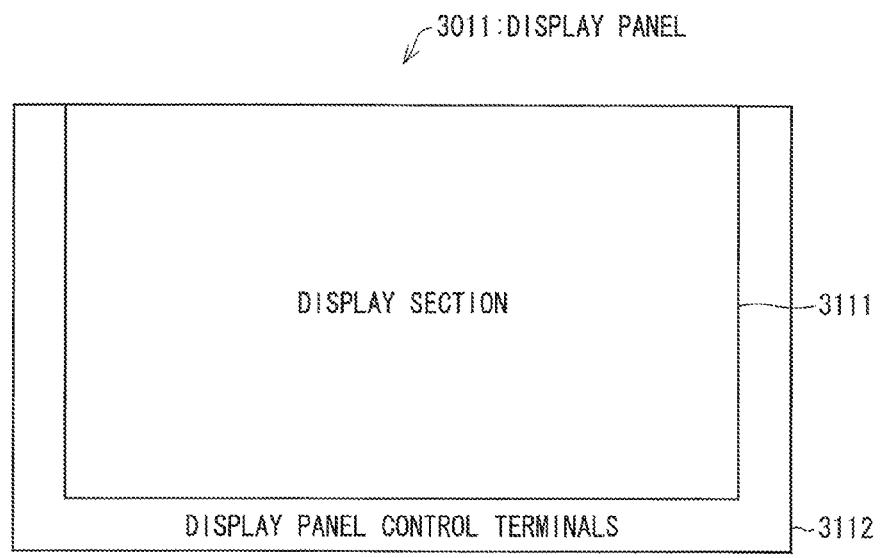
FIG. 26 is a drawing illustrating a display panel in a conventional art.

The shape of the driving module 12 is not limited to a quadrangular shape illustrated in FIG. 5. As illustrated in FIGS. 18 and 19 (mentioned later), the substrate 121 may be processed to have a polygonal shape.

The source driver SD generates a source signal and the gate driver GD generates a gate signal.

The gate driver GD is provided closer to the input terminals Tin than the source driver SD is.

The source driver SD and the gate driver GD are provided in such a manner that respective centers thereof are positioned on a center line CL of the driving module 12 which line is indicated by a dashed line in (a) of FIG. 5.

That is, in the driving module 12, the gate driver (gate driving circuit) GD and the source driver (source driving circuit) SD may be provided in such a manner that respective centers thereof are positioned on the center line CL of the driving module 12 which line passes through the side where the output terminals (the gate output terminals and the source output terminals) Tout are provided.

With the configuration, wires relating to individual signals can be provided in such a manner as to be line-symmetrical with respect to the center line CL. This allows wires to be positioned optimally.

The gate driver GD or the source driver SD which is not provided on the center line CL will result in waste in disposition of wires. This will lead to an increase in area of the driving module 12 and consequently lead to a higher cost for the driving module 12. However, with the above arrangement, such waste in disposition of wires can be prevented. This can prevent an increase in the cost for the driving module 12.

Here, in a case where the driving module 12 is a tape device in which driving circuits are provided on the substrate 121 which is a tape, the driving module 12 can be preferably used while being bent.

With the above arrangement, by positioning respective centers of the drivers on the center line CL of the driving module 12, the driving module 12 can have increased mechanical flexural strength. Consequently, the driving module 12 can be used while being bent.

Input signals supplied via the input terminals Tin of the driving module 12 are connected with input terminals of the gate driver GD and the source driver SD via wires on the substrate 121. Output terminals of the source driver SD and the gate driver GD are connected with output terminals Tout of the driving module 12 via wires on the tape.

Furthermore, input signals are supplied to the gate driver GD and the source driver SD via input terminals, so that electric power, for example is supplied.

(b) of FIG. 5 is a cross sectional view illustrating the driving module 12 taken along the center line CL of (a) of FIG. 5. As illustrated in (b) of FIG. 5, in the driving module 12, the substrate 121 and the wires 122 are stacked, and the wires 122 are connected with the source driver SD and the gate driver GD via contact points CP. A solder resist may be provided on the wires 122. Contact point portions of the source driver SD and the gate driver GD may be sealed with a resin 124.

FIG. 6 is a drawing illustrating a configuration of a driving module 120 which is a comparative example to be compared with the driving module 12. As illustrated in FIG. 6, in the driving module 120, centers of drivers (gate driver GD, source driver SD) are not located on a center line CL of the driving module 120. Consequently, (i) wires A connecting the input terminals Tin with the gate driver GD, (ii) wires B connecting the gate driver GD with the output terminals Tout, (iii) wires C connecting the input terminals Tin with the source driver SD, and (iv) wires D connecting the source driver SD with the output terminals Tout cannot be provided line-symmetrically with respect to the center line CL.

Figure 7:
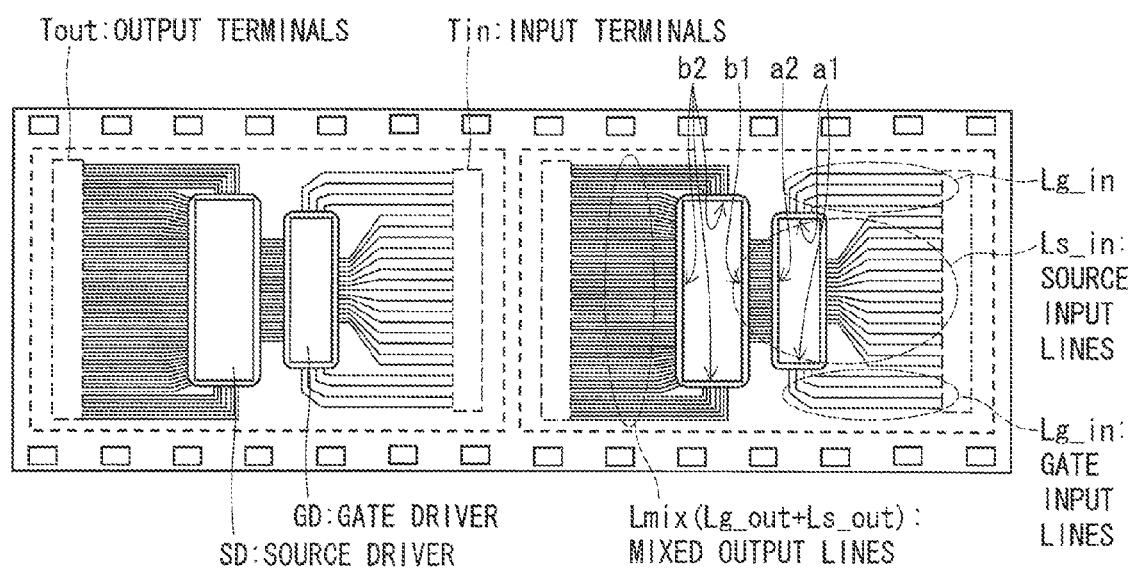
FIG. 7 is a drawing illustrating components constituting the driving module in FIG. 5.

FIG. 7 is a drawing illustrating components constituting the driving module 12. As illustrated in FIG. 7, between the input terminals Tin and the gate driver GD, there are provided gate input lines Lg_in and source input lines Ls_in. It should be noted that the gate input lines Lg_in are connected with the gate driver GD but the source input lines Ls_in are not connected with the gate driver GD, and are connected with the source driver SD via an area below the gate driver GD.

Furthermore, between the gate driver GD and the source driver SD, there are provided gate output lines Lg_out (not illustrated) outputted from the gate driver GD, and source input lines Ls_in which have passed through the area below the gate driver GD.

Between the source driver SD and the output terminals Tout, there are provided mixed output lines (gate output lines Lg_out and source output lines Lg_out) Lmix.

That is, the driving module 12 may be configured such that the gate driver (gate driving circuit) GD has a quadrangular shape, is connected with the input terminals Tin at a set of two opposing sides a1 of the gate driver GD, and is connected with the output terminals (including the gate output terminals) Tout at a side a2 of the gate driver GD which side is different from the set of two opposing sides a1 and is closer to the side where the output terminals (the gate output terminals and the source output terminals) Tout are provided, and the source driver (source driving circuit) SD is connected with the input terminals Tin via wires which pass through the gate driver GD and which are positioned between the set of two sides a1.

With the configuration, the gate driver GD can receive as many input signals as possible with use of the two sides a1 of the gate driver GD and via the input terminals Tin.

Furthermore, the source driver SD can receive as many input signals as possible via (i) the side a2 other than the two sides a1 and (ii) the input terminals Tin.

That is, the gate driver GD and the source driver SD of the driving module 12 can receive as many input signals as possible via the input terminals Tin.

Alternatively, the driving module 12 may be configured such that the source driver (source driving circuit) SD has a quadrangular shape, the source driver SD is connected with the output terminals (including the source output terminals) Tout at three sides b2 of the source driver SD, and the gate driver (gate driving circuit) GD is connected with the output terminals (including the gate output terminals) Tout via wires passing through the source driver SD and the three sides b2.

With the configuration, the driving module 12 can fan out as widely as possible with use of the three sides b2 (other than an input side b1) of the source driver SD. "Fan out" herein indicates that wires are widely spread for output.

Comparison of the configuration in which a certain number of wires from one side of the source driver SD are connected with the output terminals Tout (hereinafter configuration a) and the configuration in which a certain number of wires from three sides of the source driver SD are connected with the output terminals Tout (hereinafter configuration b) shows that the configuration a has a smaller wire pitch at one side of the source driver SD and consequently the configuration a requires a larger area in order for the wires to be fanned out while the smaller wire pitch at one side of the source driver SD is in conformity with the wire pitch of the output terminals Tout of the driving module.

However, the configuration b, which uses three sides of the source driver SD, can secure a larger wire pitch than the configuration a. That is, the configuration b does not need a large area for fan-out at a side of the source driver SD which side does not face the output terminals Tout. Accordingly, the configuration b allows a reduced wiring distance between the source driver SD and the respective output terminals Tout, so that the driving module can be made small. This allows the driving module which is smaller and lower in cost.

The following description will discuss a configuration of the driving module 12 in more details.

Figure 8:
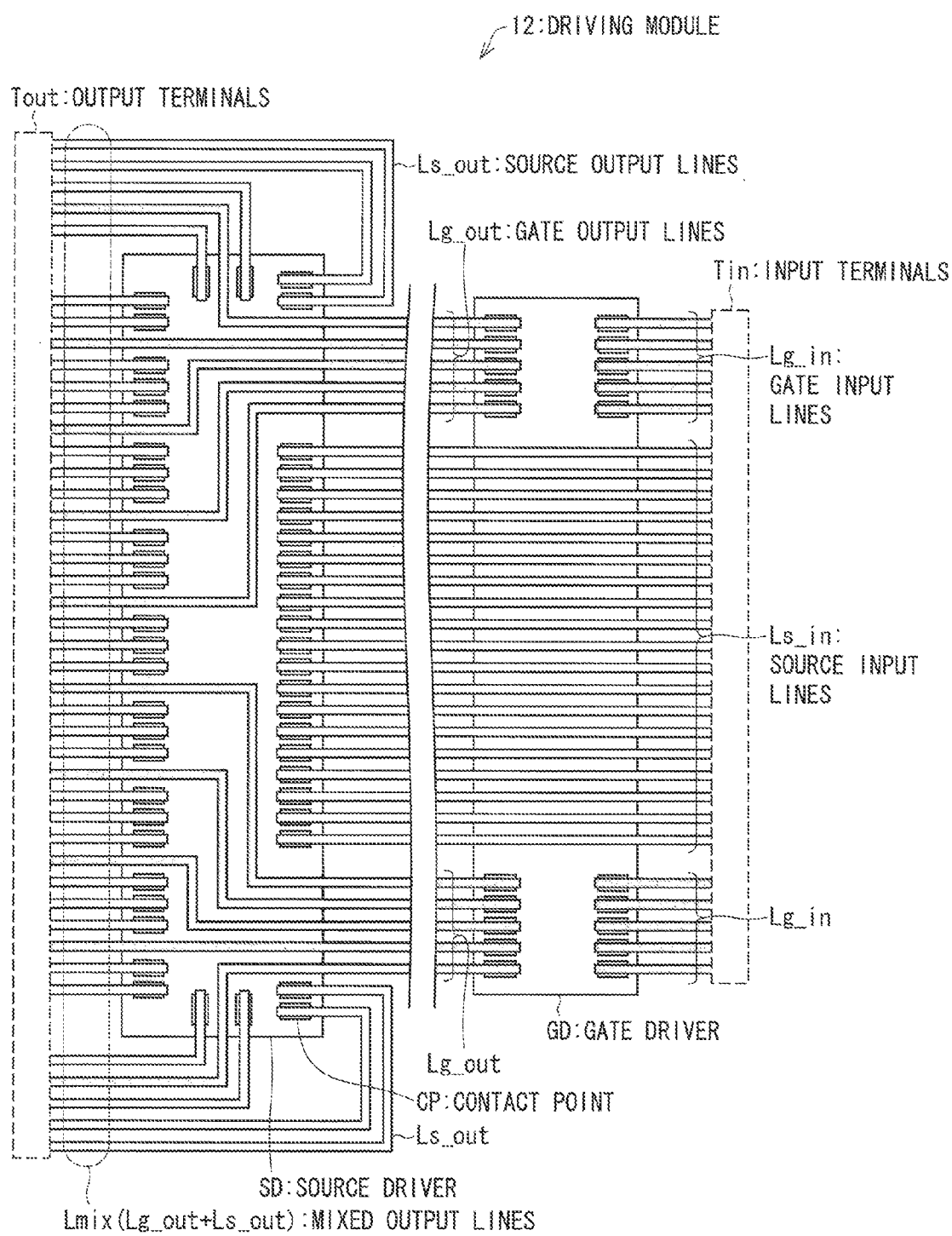
FIG. 8 is a drawing illustrating a detailed configuration of a driving module in accordance with one aspect of the present invention.

FIG. 8 is a drawing illustrating a detailed configuration of the driving module 12 in accordance with one aspect of the present invention. FIG. 8 illustrates the configuration in a case where the wires 122 (gate input lines Lg_in, source input lines Ls_in, gate output lines Lg_out, and source output lines Ls_out), the contact points CP, the gate driver GD, and the source driver SD are seen from a direction of a white arrow (from below) in (b) of FIG. 5 on the assumption that the substrate 121, the solder resist 123, and the resin 124 are absent.

As illustrated in FIG. 8, input signals (including electric power) are supplied to the gate driver GD and the source driver SD via the input terminals Tin. The input signals to the gate driver GD are each directly supplied to the gate driver GD via a corresponding wire provided on the substrate 121 (not illustrated). The input signals to the source driver SD are each supplied to the source driver SD after passing through the region below the gate driver GD via a corresponding wire provided on the substrate 121.

The output terminals Tout are provided on only one side of the driving module 12, and include a plurality of gate output terminals via which output signals (gate signals) of the gate driver GD are outputted and a plurality of source output terminals via which output signals (source signals) of the source driver SD are outputted. That is, the plurality of gate output terminals and the plurality of source output terminals are provided on only one side of the driving module 12.

Furthermore, the output terminals Tout include n source output terminals with respect to every m gate output terminals so as to correspond to the display panel in which the source control terminals and the gate control terminals (as illustrated in FIGS. 3 and 4, these control terminals are included in the display panel control terminals 112) are provided on only one side of the display panel 11 as illustrated in (a) of FIG. 2. That is, the source output terminals and the gate output terminals are provided in such a manner that m gate output lines Lg_out are provided with respect to every n source output lines Ls_out (m and n are each an integer).

Specifically, with respect to every three source output lines Ls_out provided in the output terminals Tout, one gate output line Lg_out is provided in the output terminals Tout. In this configuration, the gate output line Lg_out passes through a region below the source driver SD.

However, the present invention is not limited to this configuration. The number of the gate output lines Lg_out and the number of source output lines Ls_out may be changed depending on specifications of the display panel 11.

For example, with respect to every six source output lines Ls_out provided in the output terminals Tout, one gate output line Lg_out may be provided in the output terminals Tout.

By providing the drivers and wiring the drivers as above, it is possible to supply the display panel 11 of FIG. 2 with the source signals and the gate signals.

That is, the driving module 12 includes: input terminals Tin via which input signals from the input signal generating section 13 are supplied to the driving module 12; output terminals Tout (gate output terminals via which gate signals are outputted and source output terminals via which source signals are outputted); the gate driver (gate driving circuit) GD for generating the gate signals from the input signals supplied to the driving module 12 via the input terminals Tin; and the source driver (source driving circuit) SD for generating the source signals from the input signals supplied to the driving module 12 via the input terminals Tin, the output terminals Tout (the gate output terminals and the source output terminals) being provided on only one side of the driving module 12.

With the configuration, the driving module 12 can supply the gate signals and the source signals to the display panel via, for example, control terminals provided on only one side of the display panel. Thus, the driving module 12 can control display of the display panel by the signals. Furthermore, such gate signals and source signals are suitable for display control of a matrix liquid crystal display panel.

That is, the present invention can provide a driving module suitable for display control in which gate signals and source signals are supplied to a matrix liquid crystal display panel via only one side thereof.

In the driving module 12, the gate driver (gate driving circuit) GD may be provided closer to the input terminals Tin than the source driver (source driving circuit) SD is.

With the configuration, the gate driver GD and the source driver SD are provided in this order from the input terminals Tin. This allows wires for gate signals to fan out while mixed with a large number of wires for source signals. Consequently, an area in the driving module 12 can be used effectively, and wires can be provided efficiently.

FIG. 9 is a drawing illustrating wires passing through the gate driver GD. As illustrated in FIG. 9, in the driving module 12, the gate driver (gate driving circuit) GD may be connected with the output terminals (including the gate output terminals) Tout via source input lines Ls_in (wires) which pass through the source driver (source driving circuit) SD.

With the configuration, the gate driver GD can output the gate signals to the output terminals Tout (including the gate output terminals) via wires passing through the source driver SD. This makes it unnecessary to provide wires which detour the source driver SD, and consequently allows a shorter wiring distance. This can reduce the cost for the driving module 12.

The driving module 12 may be configured such that the input terminals Tin and the source driver (source driving circuit) SD are connected via wires passing through the gate driver (gate driving circuit) GD.

With the configuration, the source driver SD can receive input signals from the input terminals Tin via wires passing through the gate driver GD. This makes it unnecessary to provide wires which detour the gate driver GD, and consequently allows a shorter wiring distance. This can reduce the cost for the driving module 12.

Figure 10:
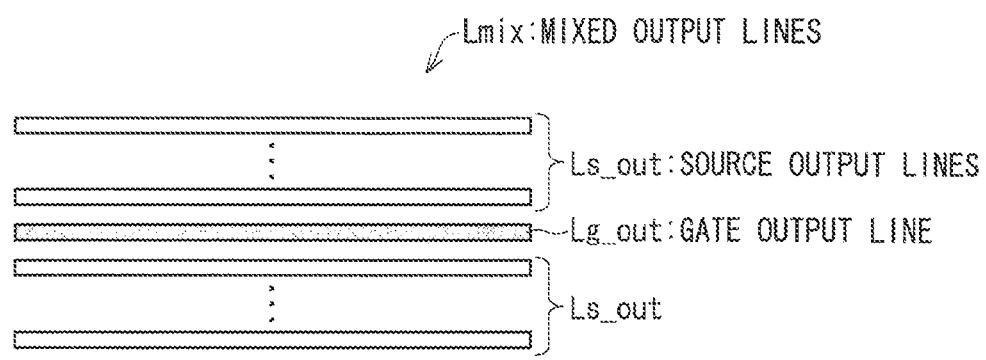
FIG. 10 is a drawing illustrating a configuration of mixed output lines included in the driving module in FIG. 8.

FIG. 10 is a drawing illustrating a configuration of mixed output lines Lmix. As illustrated in FIG. 10, the mixed output lines Lmix include a plurality of source output lines Ls_out and a plurality of gate output lines Lg_out. One gate output line Lg_out is provided with respect to every plurality of source output lines Ls_out.

For example, one gate output line Lg_out may be provided with respect to every three source output lines Ls_out, or one gate output line Lg_out may be provided with respect to every six source output lines Ls_out.

That is, in the driving module 12, three source output lines (wires for source signals) Ls_out may be provided with respect to each of the gate output lines (wires for gate signals) Lg_out.

With the configuration, the driving module 12 can control display of three colors of R, G, and B, for example.

Alternatively, in the driving module 12, six source output lines (wires for source signals) Ls_out may be provided with respect to each of the gate output lines (wires for gate signals) Lg_out.

With the configuration, the driving module 12 can control display with higher definition and higher speed.

<Effect of Display Device 1>

With the configuration, the display panel 11 can obtain gate signals and source signals via the display panel control terminals 112 (control terminals) provided on only one side of the display panel 11, so that display of the display panel 11 can be controlled by the signals. Furthermore, such gate signals and source signals are suitable for controlling display of a matrix liquid crystal display panel.

That is, the present invention can provide a display device whose display can be controlled by supplying gate signals and source signals to a matrix liquid crystal display panel via only one side of the liquid crystal display panel.

Second Embodiment

The following description will discuss another embodiment of the present invention with reference to FIGS. 11 through 14. For convenience, members having the same functions as those described in the above embodiment are given the same reference signs and explanations thereof are omitted.

<Configuration and Effect of Modification of Driving Module 12>

The driving module 12 is not limited to the above configurations. For example, the driving module 12 may be configured as described in modifications below.

(Driving Module 12a)

Figure 11:
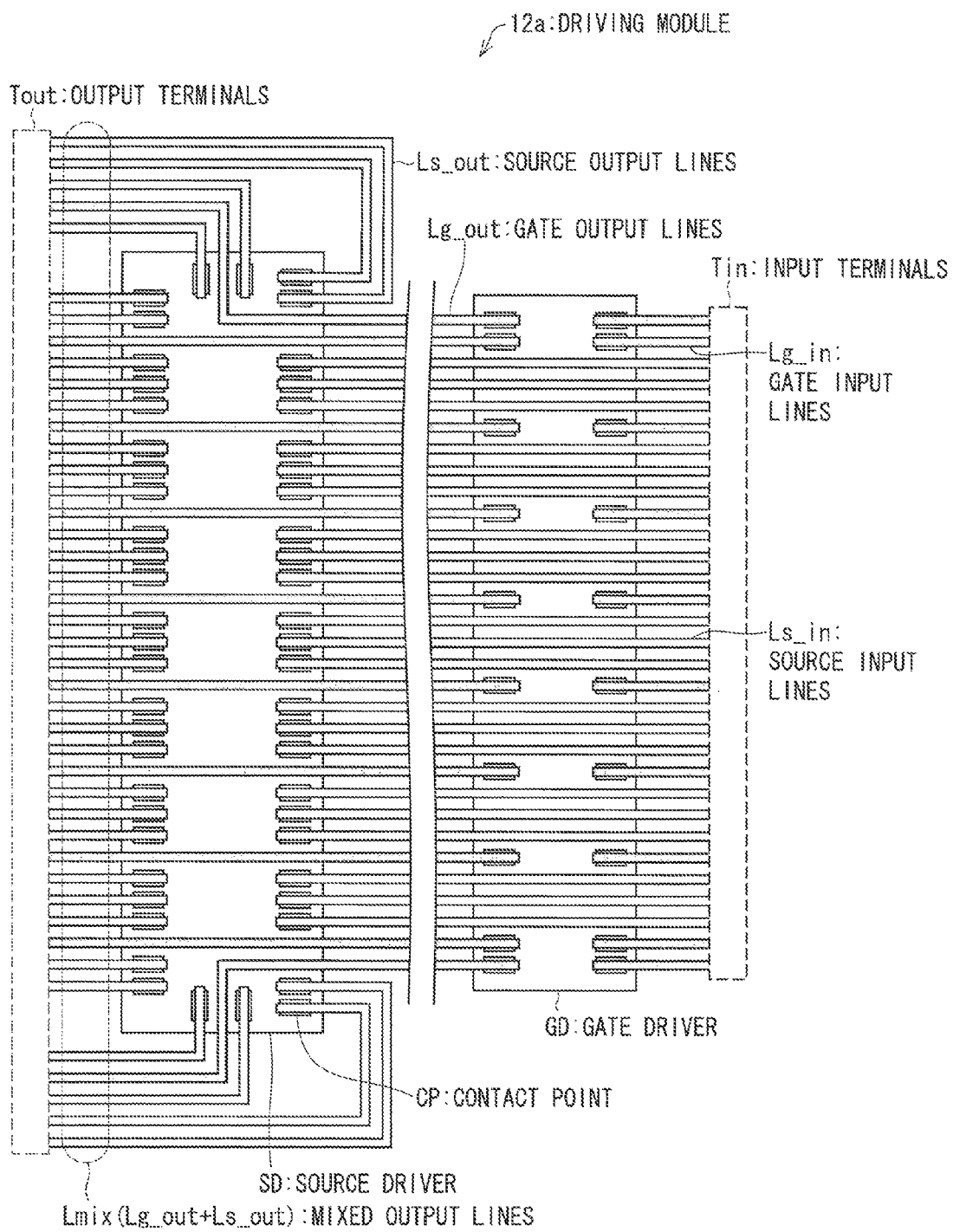
FIG. 11 is a drawing illustrating a configuration of a driving module in accordance with another aspect of the present invention.

FIG. 11 is a drawing illustrating a configuration of a driving module 12a. As illustrated in FIG. 11, the driving module 12a is configured such that source input lines Ls_in are provided between gate wires (gate input lines Lg_in, gate output lines Lg_out). As above, wires may be provided in accordance with a pattern of input terminals Tin.

(Driving Module 12b)

Figure 12:
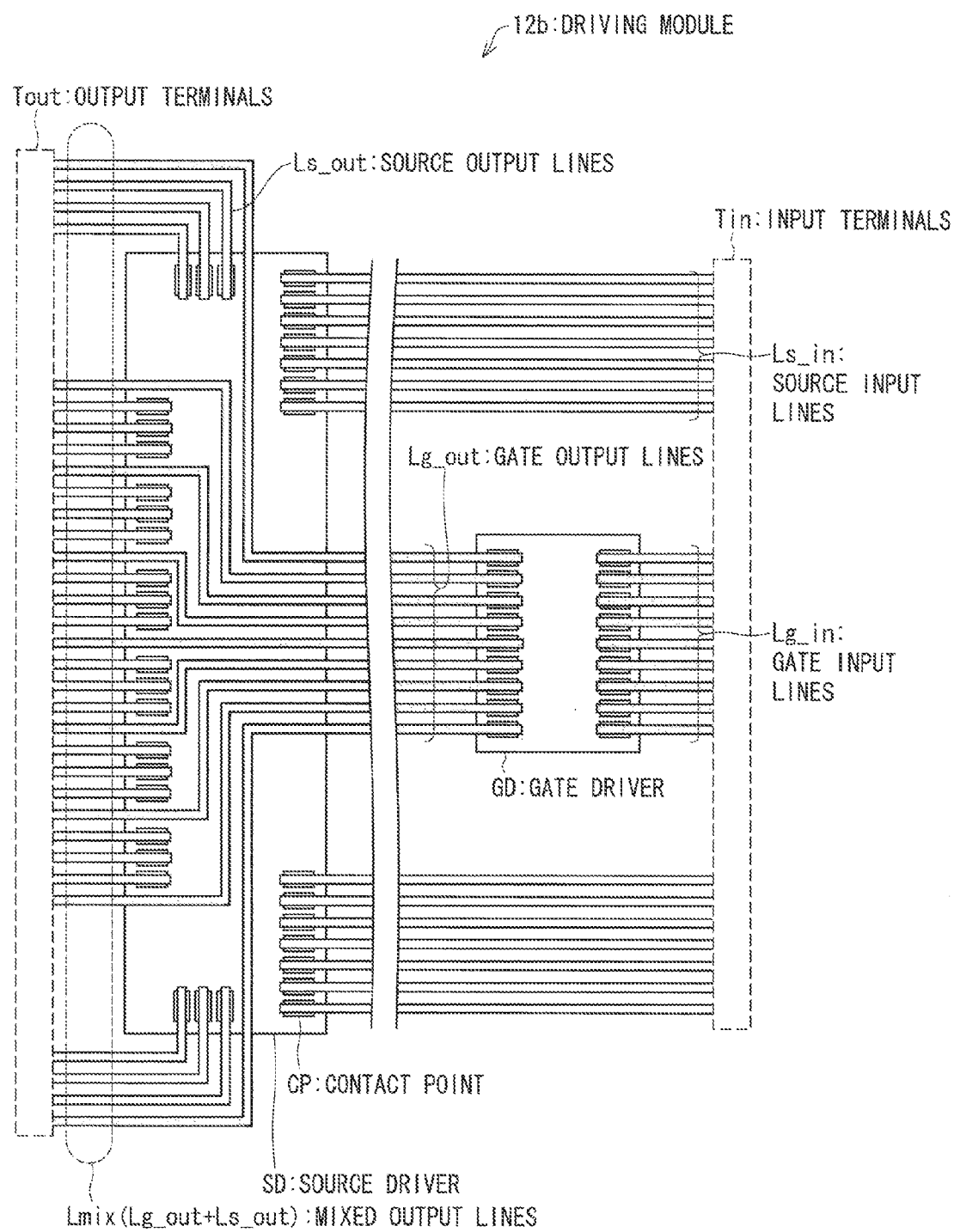
FIG. 12 is a drawing illustrating a configuration of a driving module in accordance with another aspect of the present invention.

FIG. 12 is a drawing illustrating a configuration of a driving module 12b. As illustrated in FIG. 12, the driving module 12b is configured such that source input lines Ls_in are connected with the source driver SD not by passing through the gate driver GD but by passing by both sides of the gate driver GD. As above, wires may be provided in accordance with a pattern of input terminals Tin.

(Driving Module 12c)

Figure 13:
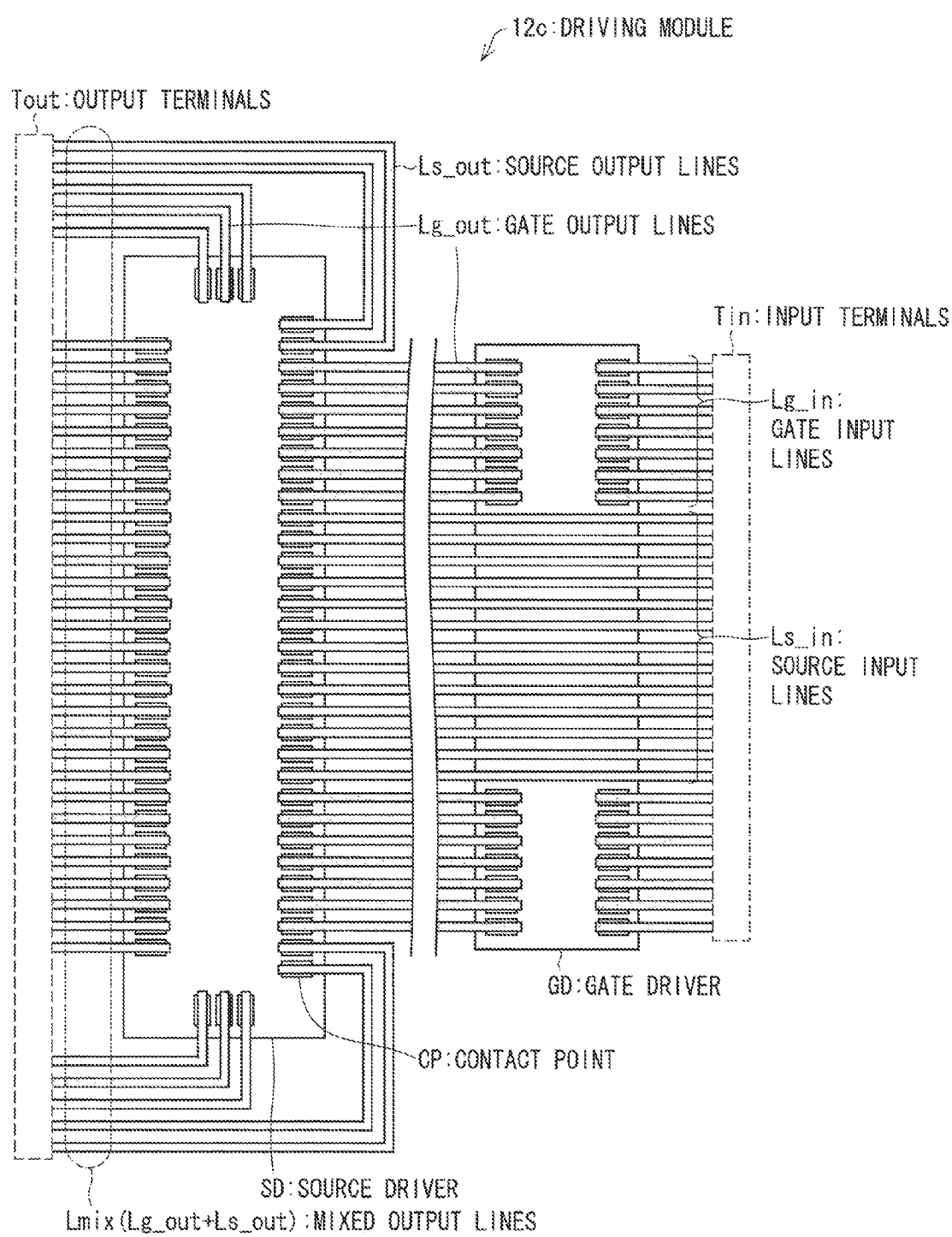
FIG. 13 is a drawing illustrating a configuration of a driving module in accordance with another aspect of the present invention.

FIG. 13 is a drawing illustrating a configuration of a driving module 12c. As illustrated in FIG. 13, the driving module 12c is configured such that gate output lines Lg_out connected with the gate driver GD are further connected with the source driver SD. The gate output lines Lg_out are extended from the source driver SD via in-circuit wires (not illustrated) of the source driver SD, and are connected with output terminals Tout.

That is, an output signal from the gate driver GD is once supplied to the source driver SD, and the source driver SD generates source signals and generates a gate signal with respect to every three outputs of source signals.

In other words, the driving module 12c includes: input terminals Tin via which input signals from the input signal generating section 13 are supplied to the driving module 12; output terminals via which gate signals and source signals are outputted (gate output terminals via which gate signals are outputted and source output terminals via which source signals are outputted) Tout; and the source driver (source driving circuit) SD for generating the source signals from the input signals supplied to the driving module 12c via the input terminals Tin, the output terminals (the gate output terminals and the source output terminals) Tout being provided on only one side of the driving module 12c, and the source driver SD including in-circuit wires which transmit the gate signals.

With the configuration, the source driver SD can transmit the gate signals via the in-circuit wires. Furthermore, the source driver SD can generate the source signals.

Therefore, the driving module 12c can supply the gate signals and the source signals via, for example, control terminals provided on only one side of a display panel, so that the driving module 12c can control display of the display panel with use of the signals. Furthermore, such gate signals and source signals are suitable for controlling display of a matrix liquid crystal display panel.

That is, it is possible to provide a driving module suitable for display control in which gate signals and source signals are supplied to a matrix liquid crystal display panel via only one side thereof.

Furthermore, use of the in-circuit wires of the source driver SD allows simpler wiring.

The display device 1 may include the driving module 12c instead of the driving module 12.

The driving module 12c may further include a gate driver (gate driving circuit) GD for generating the gate signals from input signals supplied to the driving module 12c via the input terminals Tin.

With the configuration, the in-circuit wires of the source driver SD can obtain the gate signals from the gate driver GD.

Furthermore, the display device 1 may include (i) the driving module 12 including: the input terminals Tin via which input signals from the input signal generating section 13 (not illustrated) are supplied to the driving module 12; output terminals (gate output terminals via which gate signals are outputted and source output terminals via which source signals are outputted) Tout; and the source driver (source driving circuit) SD for generating the source signals from the input signals supplied to the driving module 12 via the input terminals Tin, the output terminals (the gate output terminals and the source output terminals) Tout being provided on only one side of the driving module 12, the source driver SD including the in-circuit wires for transmitting the gate signals, and (ii) the display panel 11 including the display panel control terminals (gate control terminals which are connected with the gate output terminals and which receive the gate signals, and source control terminals which are connected with the source output terminals and which receive the source signals), the display panel 11 having a quadrangular shape, the display panel control terminals (the gate control terminals and the source control terminals) 112 being provided on only one side of the display panel 11.

With the configuration, the source driver SD can transmit gate signals via the in-circuit wires. Furthermore, the source driver SD can generate source signals.

Therefore, the display panel 11 can obtain gate signals and source signals via control terminals provided on only one side of the display panel 11, so that display of the display panel 11 can be controlled by the signals. Furthermore, such gate signals and source signals are suitable for controlling display of a matrix liquid crystal display panel.

That is, the present invention can provide a display device whose display can be controlled by supplying gate signals and source signals to a matrix liquid crystal display panel via only one side of the liquid crystal display panel.

(Driving Module 12*d*)

Figure 14:
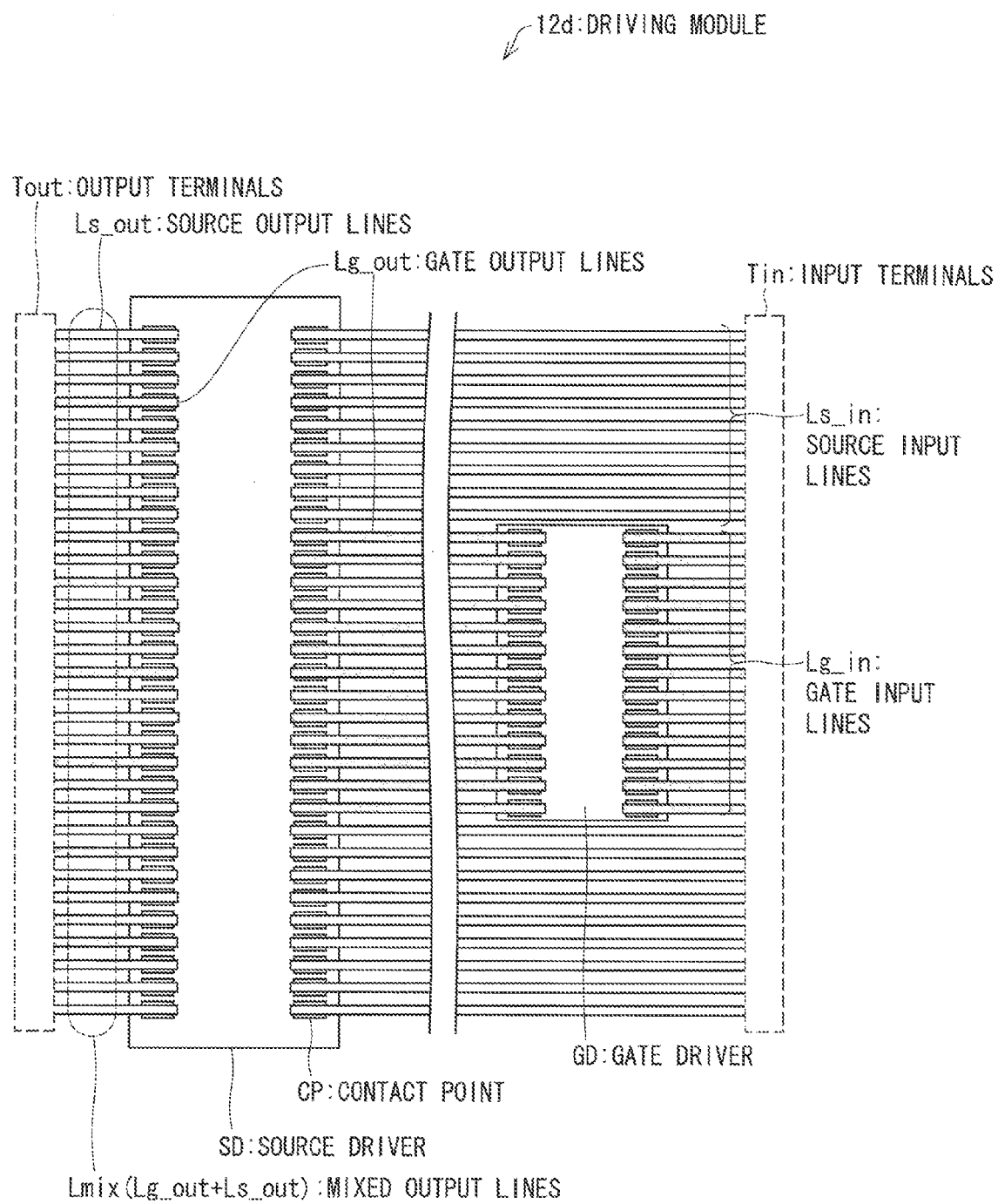
FIG. 14 is a drawing illustrating a configuration of a driving module in accordance with another aspect of the present invention.

FIG. 14 is a drawing illustrating a configuration of a driving module 12*d*. As illustrated in FIG. 14, the driving module 12*d* is configured such that source input lines Ls_in are connected with the source driver SD not by passing through the gate driver GD but by passing by both sides of the gate driver GD, and gate output lines Lg_out connected with the gate driver GD are further connected with the source driver SD. The gate output lines Lg_out are extended from the source driver SD via in-circuit wires (not illustrated) of the source driver SD, and are connected with output terminals Tout. As above, a driving module may be configured by combining a configuration of the above driving module with a configuration of another driving module.

Third Embodiment

Figure 16:
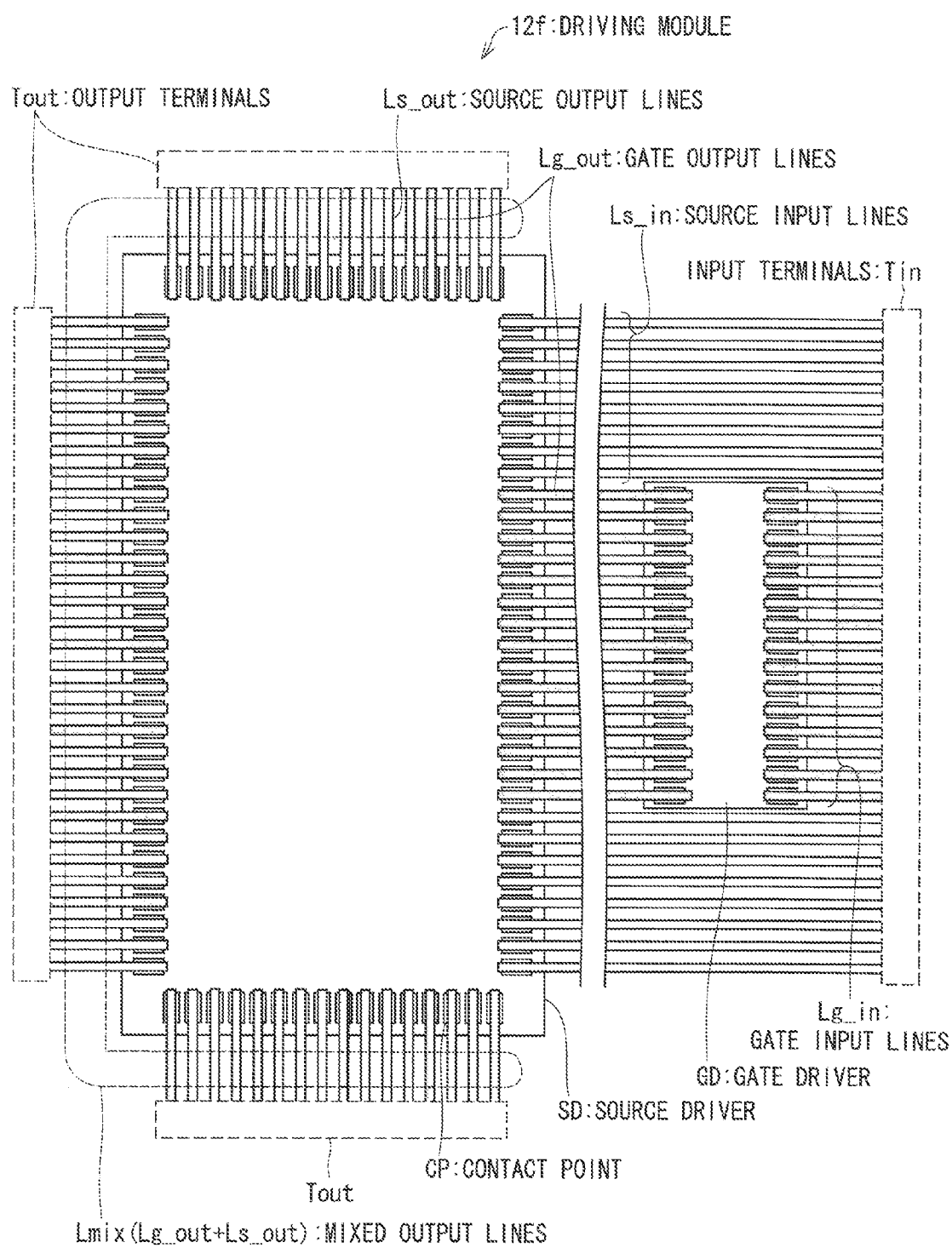
FIG. 16 is a drawing illustrating a configuration of a driving module in accordance with another aspect of the present invention.

The following description will discuss another embodiment of the present invention with reference to FIGS. 15 and 16. For convenience, members having the same functions as those described in the above embodiment are given the same reference signs and explanations thereof are omitted.

<Configuration and Effect of Another Modification of Driving Module 12>

Modifications of the driving module 12 are not limited to the above configurations. For example, the driving module 12 may be configured as described in modifications below.

(Driving Module 12*e*)

FIG. 15 is a drawing illustrating a configuration of a driving module 12*e*. As illustrated in FIG. 15, the driving module 12*e* is obtained by modifying the driving module 12*b* of FIG. 12 in such a manner that the source driver SD is shaped to be expanded in a direction in which the input terminals Tin and the output terminals Tout are connected.

In this configuration, as in the driving module 12*b*, in a case where the source driver SD has a rectangular shape which is short in a direction in which the input terminals Tin and the output terminals Tout are connected, it is possible to shorten a length between the input terminals Tin and the output terminals Tout in the driving module 12*b* as a whole. Accordingly, the driving module 12*b* is advantageous in that it can be made smaller.

However, in a case where the number of the gate output lines Lg_out and the number of the source output lines Ls_out increase, a short length of a circumference of the source driver SD requires the source driver SD to have a small pitch between contact points CP. Furthermore, the short length of the circumference of the source driver SD also requires the source driver SD to have a small pitch between the gate output lines Lg_out and a small pitch between the source output lines Ls_out. This raises a problem of costs for increasing accuracy of processing in production of a driving module.

In contrast, the driving module 12*e* is configured such that the source driver SD has substantially a square shape, so that output terminals Tout can be provided on three sides of the driving module 12*e*.

Furthermore, in the driving module 12*e*, an area of a chip (source driver SD) is made larger and a length of a circumference of the chip is made larger. Thus, a pitch between contact points CP in the chip is made larger. This allows a pitch between wires to be larger. For example, the pitch between wires can be set to approximately 50 μm.

Consequently, in production of the driving module 12*e*, minute processing is not required, so that the cost for processing can be reduced. Furthermore, since minute processing is not required, it is possible to produce a chip by earlier-generation processing. According to this, for example, it is possible to produce a chip in a depreciated factory, and consequently at lower costs.

(Driving Module 12*f*)

FIG. 16 is a drawing illustrating a configuration of a driving module 12*f*. As illustrated in FIG. 16, the driving module 12*f* is obtained by modifying the driving module 12*d* of FIG. 14 in such a manner that the source driver SD is shaped to be expanded in a direction in which the input terminals Tin and the output terminals Tout are connected.

That is, the driving module 12*f* has a configuration obtained by combining (i) a configuration in which the source driver SD includes in-circuit wires, such as the configuration of the driving module 12*d*, with (ii) a configuration of the driving module 12*e*. As above, a driving module may be configured by combining a configuration of the above driving module with a configuration of another driving module.

For example, the driving module 12*f* may be configured such that the gate driver (gate driving circuit) GD has a quadrangular shape, the gate driver GD is connected with the input terminals Tin at a set of two opposing sides of the gate driver GD, and is connected with the in-circuit wires at a side of the gate driver GD which side is other than the set of two opposing sides and is closer to the side where the output terminals (the gate output terminals and the source output terminals) Tout are provided, and the source driver (source driving circuit) SD is connected with the input terminals Tin via wires which pass through the gate driver GD and which are positioned between the set of two sides of the gate driver GD.

With the configuration, the gate driver GD can receive as many input signals as possible with use of the two sides of the gate driver GD and via the input terminals Tin.

Furthermore, with the configuration, the source driver SD can receive as many input signals as possible via the side other than the two sides of the gate driver GD and via the input terminals Tin.

That is, the driving module 12*f* is configured such that the gate driver GD and the source driver SD can receive as many input signals as possible via the input terminals Tin.

Furthermore, the driving module 12*f* may be configured such that the source driver (source driving circuit) SD has a quadrangular shape, the source driver SD is connected with the output terminals (including the source output terminals) Tout at three sides of the source driver SD, the in-circuit wires are connected with the output terminals (including gate output terminals) Tout at the three sides, and the gate driver (gate driving circuit) GD is connected with the in-circuit wires.

With the configuration, the driving module 12f can fan out as widely as possible with use of three sides (other than an input side) of the source driving circuit.

"Fan-out" herein refers to (the number of) logical outputs and "fan out" herein refers to output of source signals and gate signals. "Capable of fanning out as widely as possible" means that the number of source output lines Ls_out via which source signals are outputted and the number of gate output lines Lg_out via which gate signals are outputted can be increased.

Fourth Embodiment

<Another Configuration and Effect Yielded by the Another Configuration>

The driving module includes the gate driver GD and the source driver SD separately. However, the present invention is not limited to this configuration. The driving module in accordance with one aspect of the present invention may be arranged such that the gate driver GD and the source driver SD are replaced with one semiconductor.

That is, in the driving module, the semiconductor generates source signals and gate signals therein and outputs the source signals and the gate signals in such a manner that one gate signal is outputted with respect to every three source signals. Furthermore, the driving module may be arranged such that wires relating to the signal outputs from the semiconductor are provided so as to be in accordance with the output terminals Tout.

A display device in accordance with one aspect of the present invention may include the driving module.

For example, a display device in accordance with one aspect of the present invention includes (i) a driving module including: input terminals via which input signals are supplied to the driving module; gate output terminals via which gate signals are outputted from the driving module; source output terminals via which source signals are outputted from the driving module; and a driving circuit for generating the gate signals and the source signals from the input signals supplied to the driving module via the input terminals, the gate output terminals and the source output terminals being provided on only one side of the driving module, and (ii) a display panel including: gate control terminals which are connected with the gate output terminals and which receive the gate signals; and source control terminals which are connected with the source output terminals and which receive the source signals, the display panel having a quadrangular shape, and the gate control terminals and the source control terminals each being provided on only one side of the display panel.

With the configuration, the display panel can obtain gate signals and source signals via control terminals provided on only one side of the display panel, so that display of the display panel can be controlled by the signals. Furthermore, such gate signals and source signals are suitable for controlling display of a matrix liquid crystal display panel.

That is, the present invention can provide a display device whose display can be controlled by supplying gate signals and source signals to a matrix liquid crystal display panel via only one side of the liquid crystal display panel.

Furthermore, since the above configuration allows the number of driving circuits to be further reduced as compared with a configuration in which a gate signal and a source signal are generated by separate driving circuits, the above configuration allows the display device to be smaller and lower in cost. Consequently, it is possible to provide a display device (i) whose display can be controlled by supplying gate signals and source signals to a matrix liquid crystal display panel via only one side of the liquid crystal display panel, (ii) which is small in size, and (iii) which can be produced with lower costs.

A display device in accordance with one aspect of the present invention includes (i) the driving module including a plurality of driving modules, and (ii) a display panel including: gate control terminals which are connected with the gate output terminals and which receive the gate signals; and source control terminals which are connected with the source output terminals and which receive the source signals, the display panel having a quadrangular shape, and the gate control terminals and the source control terminals being provided on only one side of the display panel.

With the configuration, since the display device includes the plurality of the driving modules, the display device allows display control of a whole screen of a large display panel whose whole screen cannot be controlled by a single driving module.

That is, the present invention can provide a driving module suitable for controlling display of a large matrix liquid crystal display panel in which gate signals and source signals are supplied via only one side of the liquid crystal display panel.

For example, the display device 1 illustrated in FIG. 1 includes three driving modules 12.

Fifth Embodiment

Figure 17:
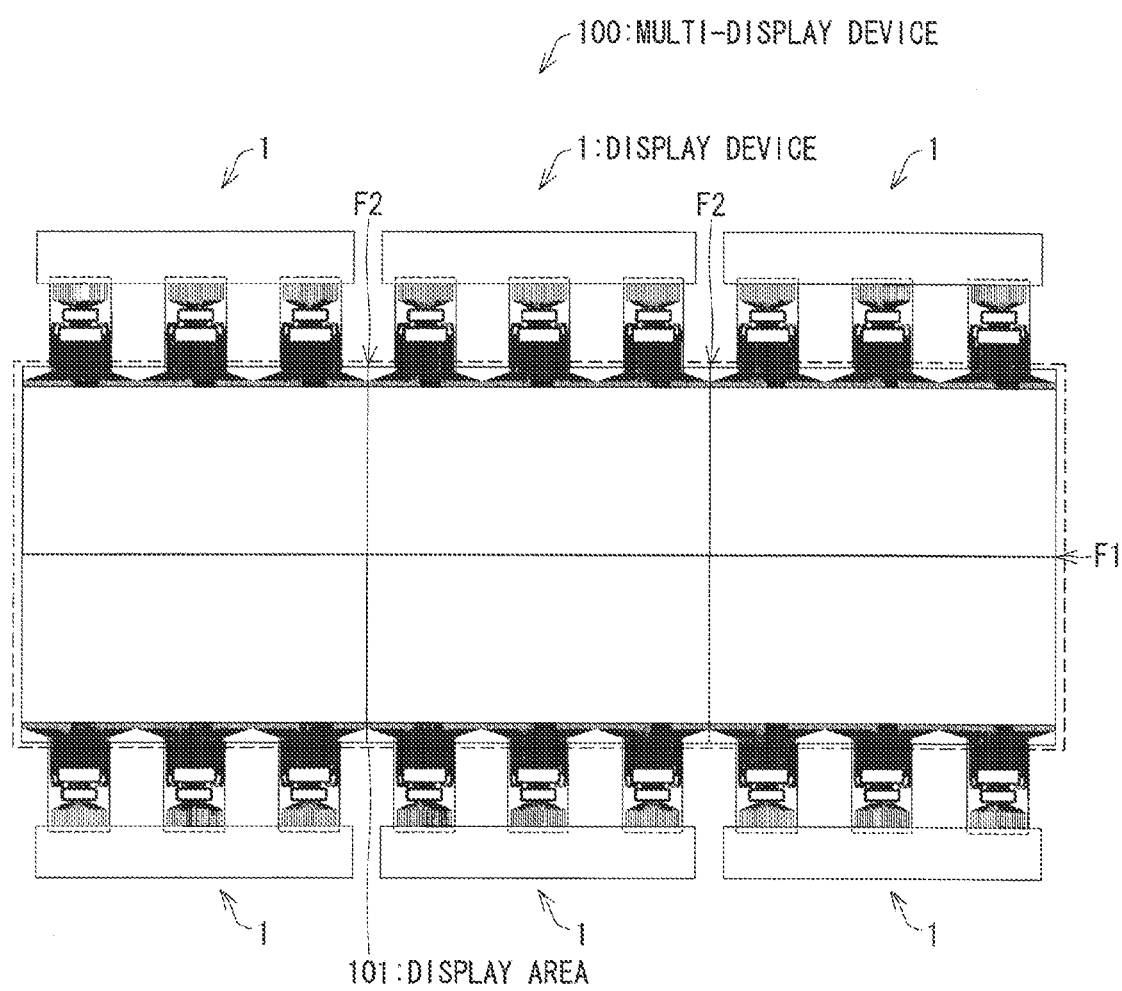
FIG. 17 is a drawing illustrating a configuration of a multi-display device in accordance with one aspect of the present invention.

The following description will discuss another embodiment of the present invention with reference to FIG. 17. For convenience, members having the same functions as those described in the above embodiment are given the same reference signs and explanations thereof are omitted.

<Configuration and Effect of Multi-Display Device 100>

FIG. 17 is a drawing illustrating a configuration of a multi-display device 100. As illustrated in FIG. 17, the multi-display device 100 includes six display devices 1 which are combined with each other via at least one side of three sides of each display device 1, the at least one side having no display panel control terminals 112 provided thereon.

For example, the display device 1 positioned at a corner portion of the multi-display device 100 is combined with other display devices 1 at two sides thereof indicated by contact sides F1 and F2. The display device 1 positioned at a central portion of the multi-display device 100 is combined with other display devices 1 at three sides thereof indicated by the contact sides F1 and F2.

With the configuration, the multi-display device 100 realizes a large display region 101 which is six times larger in area than a display region of the display device 1.

That is, the multi-display device 100 includes a plurality of the display devices 1 which are combined with each other via at least one side of each of the plurality of the display devices 1, the at least one side having no display panel control terminals (not illustrated) (neither gate control terminals nor source control terminals) provided thereon.

With the configuration, by combining the plurality of the display devices 1, the multi-display device 100 can include the display region 101 which is larger than the display region of a single display device 1.

Furthermore, since contacting portions of the display devices 1 have no control terminals (gate control terminals, source control terminals), the contacting (non-display) portions can be made smaller.

That is, it is possible to provide a multi-display device including a large display region and a small non-display portion.

[Shape of Driving Module]

FIG. 18 is a drawing illustrating a configuration of a driving module 12A in accordance with another aspect of the present invention. (a) of FIG. 18 illustrates the driving module 12A in which a substrate 121 has not been subjected to punching. (b) of FIG. 18 illustrates the driving module 12A (final shape) in which the substrate 121 has been subjected to punching. As illustrated in (a) of FIG. 18, the driving module 12A in which the substrate 121 has not been subjected to punching has a quadrangular shape. The phrase "the substrate 121 is subjected to punching" herein means that an unnecessary portion of the substrate 121 is removed so that the driving module has a desired shape. For example, the driving module 12A has a smaller width at the input terminal Tin side than at output terminal Tout side. Consequently, the substrate 121 has, at the input terminal Tin side, a region where no wires are required. As illustrated in (b) of FIG. 18, by punching out, from the substrate 121, a portion, for example, which is such an unnecessary region as described above, it is possible to obtain the driving module 12A having a polygonal shape and a smaller width at the input terminal Tin side than at the output terminal Tout side.

FIG. 19 is a drawing illustrating a configuration of a driving module 12B in accordance with another aspect of the present invention. (a) of FIG. 19 illustrates the driving module 12B in which a substrate 121 has not been subjected to punching. (b) of FIG. 19 illustrates the driving module 12B (final shape) in which the substrate 121 has been subjected to punching. Unlike the driving module 12A in (a) of FIG. 18, the driving module 12B illustrated in (a) of FIG. 19 is configured such that wires connecting the input terminals Tin with the gate driver GD are connected with two opposing sides c 1 of the gate driver GD. As illustrated in (b) of FIG. 19, by subjecting the substrate 121 to punching while securing wire regions where the two sides c 1 are connected with the input terminals Tin, it is possible to obtain the driving module 12B which has a polygonal shape and from which an unnecessary region has been removed.

The above embodiments have shown examples of a configuration in which the driving module has a quadrangular shape. However, the present invention is not limited to this configuration. As in the examples illustrated in FIGS. 18 and 19, by punching out an unnecessary portion from the substrate 121, the driving module can be configured to have a desired shape, e.g., a polygonal shape.

[Conclusion]

A driving module in accordance with one aspect of the present invention is a driving module, including: an input terminal via which an input signal is supplied to the driving module; at least one gate output terminal (included in the output terminals Tout) via which a gate signal is outputted from the driving module; at least one source output terminal (included in the output terminals Tout) via which a source signal is outputted from the driving module; a gate driving circuit (gate driver GD) for generating the gate signal from the input signal supplied to the driving module via the input terminal; and a source driving circuit (source driver SD) for generating the source signal from the input signal supplied to the driving module via the input terminal, said at least one gate output terminal and said at least one source output terminal each being provided on only one side of the driving module.

With the arrangement, the driving module can supply a gate signal and a source signal via, for example, control terminals etc. on only one side of a display panel and can control display of the display panel by the signals. Furthermore, such a gate signal and a source signal are suitable for controlling display of a matrix liquid crystal display panel.

That is, the present invention can provide a driving module suitable for controlling a matrix liquid crystal display panel in which a gate signal and a source signal are supplied to the liquid crystal display panel via only one side thereof.

The driving module in accordance with one aspect of the present invention may be arranged such that said at least one gate output terminal includes a plurality of gate output terminals and said at least one source output terminal includes a plurality of source output terminals, n source output terminals of the plurality of source output terminals are provided with respect to every m gate output terminals of the plurality of gate output terminals, and m and n are each an integer.

With the arrangement, the gate output terminals and the source output terminals can be provided regularly with a predetermined ratio (m:n), and consequently wires connected with the output terminals can be provided regularly, too. Output terminals and wires which are provided irregularly will result in waste in disposition of the output terminals and the wires. This will lead to an increase in an area of the driving module, resulting in an increase in costs for the driving module. However, with the above arrangement, such waste in disposition can be prevented. This can prevent an increase in costs for the driving module.

The driving module in accordance with one aspect of the present invention may be arranged such that a ratio of m to n is 1:3 or 1:6.

With the arrangement, when the ratio of m to n is 1:3, the driving module can control display of three colors of R, G, and B, for example, and when the ratio is 1:6, the driving module can control display with higher definition and higher speed.

The driving module in accordance with one aspect of the present invention may be arranged such that the source driving circuit has a quadrangular shape, the source driving circuit is connected with said at least one source output signal at three sides of the source driving circuit, the gate driving circuit is connected with said at least one gate output terminal via wires passing through the source driving circuit and the three sides of the source driving circuit, and wires connecting the three sides with said at least one gate output terminal and wires connecting the three sides with said at least one source output terminal are mixed and fan out from the source driving circuit.

With the arrangement, the driving module can fan out as widely as possible with use of three sides (other than input side) of the source driving circuit.

The driving module in accordance with one aspect of the present invention may be arranged such that the gate driving circuit is provided closer to the input terminals than the source driving circuit is.

With the arrangement, the gate driving circuit and the source driving circuit are provided in this order from the input terminals. This allows wires for gate signals to fan out while mixed with a large number of wires for source signals. Consequently, an area in the driving module can be used effectively, and wires can be provided efficiently.

A display panel in accordance with one aspect of the present invention is a display panel, including: gate control lines parallel to each other; source control lines parallel to each other and orthogonal to the gate control lines; gate control branch lines branching from the respective gate control lines; source control terminals connected with the respective source control lines; and gate control terminals connected with the respective gate control branch lines, the display panel having a quadrangular shape, and the gate control terminals and the source control terminals each being provided on only one side of the display panel.

With the arrangement, the present invention can provide a display panel including control terminals (display panel control terminals 112, gate control terminals Tg, and source control terminals Ts) on only one side of the display panel.

A display device in accordance with one aspect of the present invention is a display device, including: at least one driving module of the above driving modules, and the above display panel, said at least one gate output terminal being connected with the gate control terminals, and said at least one source output terminal being connected with the source control terminals.

With the arrangement, the display device can obtain a gate signal and a source signal from the driving module via control terminals on only one side of the display panel. Furthermore, such a gate signal and a source signal are suitable for controlling display of a matrix liquid crystal display panel.

That is, the present invention can provide a display device whose display can be controlled by supplying a gate signal and a source signal via only one side of a matrix liquid crystal display panel.

The display device in accordance with one aspect of the present invention may be arranged such that said at least one driving module includes a plurality of driving modules, and the plurality of driving modules are provided on only one side of the display panel.

With the arrangement, since the display device includes the plurality of driving modules, the display device allows display control of a whole screen of a large display panel whose whole screen cannot be controlled by a single driving module.

That is, the present invention can provide a display device suitable for display control of a matrix large liquid crystal display panel in which a gate signal and a source signal are supplied via only one side of the liquid crystal display panel.

A multi-display device in accordance with one aspect of the present invention is a multi-display device, including a plurality of the above display devices, the plurality of the above display devices being combined with each other via at least one side (contacting sides F1 and F2) of each of the plurality of the display devices, said at least one side having neither gate control terminals nor source control terminals provided thereon.

With the arrangement, the multi-display device can have a larger display region than that of a single display device by combining a plurality of display devices.

Furthermore, since no control terminals (gate control terminals, source control terminals) are present at contact portions of the display devices, it is possible to downsize the contact (non-display) portions.

That is, the present invention can provide a multi-display device which has a large display region and small non-display portions.

[Other Expressions of the Present Invention]

The driving module in accordance with one aspect of the present invention may be arranged such that the gate driving circuit is connected with the gate output terminals via wires passing through the source driving circuit.

With the arrangement, the gate driving circuit can output a gate signal to the gate output terminals via wires passing through the source driving circuit. This makes it unnecessary to provide wires which detour the source driving circuit and makes it possible to shorten a length of wires. This ultimately reduces costs for the driving module.

The driving module in accordance with one aspect of the present invention may be arranged such that respective centers of the gate driving circuit and the source driving circuit are positioned on a center line of the driving module which center line passes through the side of the driving module where the gate output terminals and the source output terminals are provided.

With the arrangement, wires for the signals can be provided line-symmetrically with respect to the center line. This allows the wires to be positioned optimally.

The gate driving circuit or the source driving circuit which is not provided on the center line will result in waste in disposition of wires. This will lead to an increase in an area of the driving module, resulting in a higher cost for the driving module. However, with the above arrangement, such waste in disposition can be prevented. This can prevent an increase in the cost for the driving module.

Here, in a case where the driving module is a tape device in which driving circuits are provided on a tape, it is preferable that the driving module can be used while being bent.

With the above arrangement, by providing respective centers of the drivers on the center line of the driving module, the driving module can have increased mechanical flexural strength. Consequently, the driving module can be used while being bent.

The driving module in accordance with one aspect of the present invention may be arranged such that the input terminals are connected with the source driving circuit via wires passing through the gate driving circuit.

With the arrangement, the source driving circuit can receive an input signal from the input terminals via the wires passing through the gate driving circuit. This makes it unnecessary to provide wires which detour the gate driving circuit, and makes it possible to shorten a length of the wires. This ultimately allows the costs for the driving module to be reduced.

The driving module in accordance with one aspect of the present invention may be arranged such that the gate driving circuit has a quadrangular shape, the gate driving circuit is connected with the input terminals at a set of two opposing sides of the gate driving circuit, and is connected with the gate output terminals at a side of the gate driving circuit which is other than the set of two opposing sides and which is closer to the side where the gate output terminals and the source output terminals are provided, and the source driving circuit is connected with the input terminals via wires which pass through the gate driving circuit and which are positioned between the set of two sides.

With the arrangement, the gate driving circuit can receive as many input signals as possible with use of the two sides of the gate driving circuit and via the input terminals.

Furthermore, with the arrangement, the source driving circuit can receive as many input signals as possible via the side other than the two sides of the gate driving circuit and via the input terminals.

That is, the driving module is configured such that the gate driving circuit and the source driving circuit can receive as many input signals as possible via the input terminals.

A display device in accordance with one aspect of the present invention includes (i) a driving module including: input terminals via which input signals are supplied to the driving module; gate output terminals via which gate signals are outputted from the driving module; source output terminals via which source signals are outputted from the driving module; and a source driving circuit for generating the source signals from the input signals which have been supplied to the driving module via the input terminals, the driving module having a quadrangular shape, the gate output terminals and the source output terminals being provided on only one side of the driving module, the source driving circuit including in-circuit wires which transmit the gate signals, and (ii) a display panel including: gate control terminals which are connected with the gate output terminals and which receive the gate signals; and source control terminals which are connected with the source output terminals and which receive the source signals, the display panel having a quadrangular shape, and the gate control terminals and the source control terminals being provided on only one side of the display panel.

With the arrangement, the source driving circuit can transmit gate signals via the in-circuit wires, and the source driving circuit can generate source signals.

Therefore, the display panel can obtain gate signals and source signals via control terminals on only one side of the display panel, so that display of the display panel can be controlled by the signals. Furthermore, such gate signals and source signals are suitable for controlling display of a matrix liquid crystal display panel.

That is, the present invention can provide a display device whose display can be controlled by supplying gate signals and source signals via only one side of a matrix liquid crystal display panel.

The driving module in accordance with one aspect of the present invention includes: input terminals via which input signals are supplied to the driving module; gate output terminals via which gate signals are outputted from the driving module; source output terminals via which source signals are outputted from the driving module; and a source driving circuit for generating the source signals from the input signals which have been supplied to the driving module via the input terminals, the gate output terminals and the source output terminals being provided on only one side of the driving module, the source driving circuit including in-circuit wires which transmit the gate signals.

With the arrangement, the source driving circuit can transmit gate signals via the in-circuit wires. Furthermore, the source driving circuit can generate source signals.

With the arrangement, the driving module can supply gate signals and source signals to a display panel via, for example, control terminals etc. on only one side of the display panel. Thus, the driving module can control display of the display panel by the signals. Such gate signals and source signals are suitable for controlling display of a matrix liquid crystal display panel.

That is, the present invention can provide a driving module suitable for controlling display of a matrix liquid crystal display panel in which gate signals and source signals are supplied to the liquid crystal display panel via only one side thereof.

The driving module in accordance with one aspect of the present invention may be arranged so as to further include a gate driving circuit for generating the gate signals from input signals supplied to the driving module via the input terminals.

With the arrangement, the in-circuit wires of the source driving circuit can obtain gate signals from the gate driving circuit.

The driving module in accordance with one aspect of the present invention may be arranged such that the gate driving circuit has a quadrangular shape, is connected with the input terminals at a set of two opposing sides of the gate driving circuit, and is connected with the in-circuit wires at a side of the gate driving circuit which side is different from the set of two opposing sides and is closer to the side where the gate output terminals and the source output terminals are provided, and the source driving circuit is connected with the input terminals via wires which pass through the gate driving circuit and which are positioned between the set of two sides.

With the arrangement, the gate driving circuit can receive as many input signals as possible with use of the two sides of the gate driving circuit and via the input terminals.

Furthermore, the source driving circuit can receive as many input signals as possible via the side other than the two sides of the gate driving circuit and via the input terminals.

That is, the gate driving circuit and the source driving circuit of the driving module can receive as many input signals as possible via the input terminals.

The driving module in accordance with one aspect of the present invention may be arranged such that the source driving circuit has a quadrangular shape, the source driving circuit is connected with the source output terminals at three sides of the source driving circuit, and the in-circuit wires are connected with the gate output terminals at the three sides, and the gate driving circuit is connected with the in-circuit wires.

With the arrangement, the driving module can fan out as widely as possible with use of three sides (other than an input side) of the source driving circuit.

A display device in accordance with one aspect of the present invention includes (i) a driving module including: input terminals via which input signals are supplied to the driving module; gate output terminals via which gate signals are outputted from the driving module; source output terminals via which source signals are outputted from the driving module; and a driving circuit for generating the gate signals and the source signals from the input signals which have been supplied to the driving module via the input terminals, the gate output terminals and the source output terminals being provided on only one side of the driving module, and (ii) a display panel including: gate control terminals which are connected with the gate output terminals and which receive the gate signals; and source control terminals which are connected with the source output terminals and which receive the source signals, the display panel having a quadrangular shape, and the gate control terminals and the source control terminals being provided on only one side of the display panel.

With the arrangement, the display panel can obtain gate signals and source signals via control terminals on only one side of the display panel, so that display of the display panel can be controlled by the signals. Furthermore, such gate signals and source signals are suitable for controlling display of a matrix liquid crystal display panel.

That is, the present invention can provide a display device whose display can be controlled by supplying gate signals and source signals via only one side of a matrix liquid crystal display panel.

Furthermore, since the above arrangement allows the number of driving circuits to be reduced compared with a configuration in which gate signals and source signals are generated by separate driving circuits, the above arrangement allows the display device to be downsized and the costs for the display device to be reduced. Consequently, it is possible to provide a display device (i) whose display can be controlled by supplying gate signals and source signals to a matrix liquid crystal display panel via only one side of the liquid crystal display panel, (ii) which is small in size, and (iii) which can be produced with lower costs.

A display device in accordance with one aspect of the present invention includes (i) a plurality of the driving modules, and (ii) a display panel including: gate control terminals which are connected with the gate output terminals and which receive the gate signals; and source control terminals which are connected with the source output terminals and which receive the source signals, the display panel having a quadrangular shape, and the gate control terminals and the source control terminals being provided on only one side of the display panel.

With the arrangement, since the display device includes the plurality of the driving modules, the display device allows display control of a whole screen of a large display panel whose whole screen cannot be controlled by a single driving module.

That is, the present invention can provide a display device suitable for controlling display of a matrix large liquid crystal display panel in which gate signals and source signals are supplied to the liquid crystal display panel via only one side of the liquid crystal display panel.

[Additional Matters]

The present invention is not limited to the description of the embodiments above, but may be altered by a skilled person within the scope of the claims. An embodiment based on a proper combination of technical means disclosed in different embodiments is encompassed in the technical scope of the present invention. Furthermore, a new technical feature can be made by combining technical means disclosed in individual embodiments.

INDUSTRIAL APPLICABILITY

The present invention is widely usable for a matrix display device.

REFERENCE SIGNS LIST

1 Display device
11 Display panel
12 Driving module
12a Driving module
12b Driving module
12c Driving module
12d Driving module
12e Driving module
12f Driving module
12A Driving module
12B Driving module
100 Multi-display device
GD Gate driver (gate driving circuit)
Lb Gate control branch line
Lg Gate control line
Ls Source control line
SD Source driver (source driving circuit)
Tg Gate control terminal
Ts Source control terminal

The invention claimed is:

1. A driving module, comprising:
   an input terminal via which an input signal is supplied to the driving module;
   at least one gate output terminal via which a gate signal is outputted from the driving module;
   at least one source output terminal via which a source signal is outputted from the driving module;
   a gate driving circuit for generating the gate signal from the input signal supplied to the driving module via the input terminal;
   a source driving circuit for generating the source signal from the input signal supplied to the driving module via the input terminal;
   at least one gate wire via which the gate driving circuit is connected with said at least one gate output terminal; and
   at least one source wire via which the source driving circuit is connected with said at least one source output terminal,
   said at least one gate output terminal and said at least one source output terminal each being provided on only one side of the driving module,
   the source driving circuit having a quadrangular shape,
   the source driving circuit being connected via said at least one source wire with said at least one source output terminal at three sides of the source driving circuit,
   the gate driving circuit being connected with said at least one gate output terminal via said at least one gate wire passing through the source driving circuit and the three sides of the source driving circuit, and
   said at least one gate wire and said at least one source wire being mixed and fanning out from the source driving circuit.

2. The driving module as set forth in claim 1, wherein
said at least one gate output terminal includes a plurality of gate output terminals and said at least one source output terminal includes a plurality of source output terminals,
n source output terminals of the plurality of source output terminals are provided with respect to every m gate output terminals of the plurality of gate output terminals, and
m and n are each an integer.

3. The driving module as set forth in claim 2, wherein a ratio of m to n is 1:3 or 1:6.

4. The driving module as set forth in claim 1, wherein the gate driving circuit is provided closer to the input terminal than the source driving circuit is.

5. A display device, comprising:
at least one driving module as set forth in claim 1, and
a display panel which includes: gate control lines parallel to each other; source control lines parallel to each other and orthogonal to the gate control lines; gate control branch lines branching from the respective gate control lines; source control terminals connected with the respective source control lines; and gate control terminals connected with the respective gate control branch lines, the display panel having a quadrangular shape, and the gate control terminals and the source control terminals each being provided on only one side of the display panel,
said at least one gate output terminal being connected with the gate control terminals, and
said at least one source output terminal being connected with the source control terminals.

6. The display device as set forth in claim 5, wherein
said at least one driving module includes a plurality of driving modules, and
the plurality of driving modules are provided on only one side of the display panel.

7. A multi-display device, comprising a plurality of display devices as set forth in claim 5, the plurality of display devices being combined with each other via at least one side of each of the plurality of display devices, said at least one side having neither gate control terminals nor source control terminals provided thereon.

* * * * *